(12) United States Patent
Nozka et al.

(10) Patent No.: US 12,209,655 B1
(45) Date of Patent: Jan. 28, 2025

(54) ACTUATOR SYSTEMS FOR FLIGHT CONTROL SURFACE

(71) Applicant: HONEYWELL INTERNATIONAL INC., Charlotte, NC (US)

(72) Inventors: Michal Nozka, Brno (CZ); Antonin Skarolek, Brno (CZ)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 18/346,552

(22) Filed: Jul. 3, 2023

(51) Int. Cl.
*F16H 57/04* (2010.01)
*B64C 13/02* (2006.01)

(52) U.S. Cl.
CPC ......... *F16H 57/0497* (2013.01); *B64C 13/02* (2013.01)

(58) Field of Classification Search
CPC ...................................................... B64C 13/02
See application file for complete search history.

(56) References Cited

U.S. PATENT DOCUMENTS

| | | | |
|---|---|---|---|
| 8,196,484 B2 | 6/2012 | Holker et al. | |
| 8,794,095 B2 | 8/2014 | Merlet et al. | |
| 9,520,756 B2 | 12/2016 | Fedosovsky et al. | |
| 9,568,077 B2 | 2/2017 | Jacob et al. | |
| 10,371,275 B2 | 8/2019 | Lenz | |
| 11,376,807 B2 | 7/2022 | Obrecht et al. | |
| 2004/0082431 A1 | 4/2004 | Maydew | |
| 2009/0260464 A1 | 10/2009 | Holker et al. | |
| 2019/0309835 A1 | 10/2019 | Laurent | |
| 2020/0166107 A1* | 5/2020 | Wu | F16H 25/2252 |
| 2022/0325764 A1 | 10/2022 | Manzanares et al. | |

FOREIGN PATENT DOCUMENTS

| | | | | |
|---|---|---|---|---|
| CN | 110107664 A | | 8/2019 | |
| CN | 112460216 A | | 3/2021 | |
| CN | 116802752 A | * | 9/2023 | ........... H01F 41/048 |
| RU | 2719493 C1 | | 4/2020 | |
| WO | 2015127497 A1 | | 9/2015 | |
| WO | 2017041854 A1 | | 3/2017 | |
| WO | 2019151907 A1 | | 8/2019 | |

* cited by examiner

*Primary Examiner* — Vicky A Johnson
(74) *Attorney, Agent, or Firm* — Lorenz & Kopf LLP

(57) ABSTRACT

An actuator system for a flight control surface of an aerial vehicle includes a shaft. The shaft includes at least one roller to rotate with the shaft and a plunger. The at least one roller includes a plurality of roller threads. The actuator system includes an inverted nut defining an inner bore including a plurality of nut threads. The inverted nut is coupled about the shaft such that the plurality of nut threads are to engage with the plurality of roller threads to move the inverted nut relative to the shaft. The inverted nut includes a source of a lubricant in fluid communication with the inner bore and the plunger is to be received within the inner bore to supply the lubricant to the at least one roller.

17 Claims, 20 Drawing Sheets

ACTUATOR SYSTEMS FOR FLIGHT CONTROL SURFACE

TECHNICAL FIELD

The present disclosure generally relates vehicles, such as aerial vehicles, and more particularly relates to actuator systems for moving a flight control surface of an aerial vehicle.

BACKGROUND

Certain aerial vehicles, such as aircraft, generally have one or more surfaces that are movable to control a flight of the aerial vehicle. Typically, one or more actuators are employed to move the flight control surface. In certain instances, ball screw actuators may be employed to move the flight control surface. Long stroke ball screw actuators, however, may have a low stiffness, which may lead to low natural frequencies. In order to overcome the low natural frequencies, larger output rod and ball screws may be employed to increase the stiffness and natural frequency of the ball screw actuator. The large diameter output rod adds weight to the aerial vehicle, and results in increased space needed for the operation of the ball screw actuator. In addition, due to the size of the ball screw actuator, maintenance associated with the actuator may be time consuming and complex.

Accordingly, it is desirable to provide actuator systems for moving a flight control surface of an aerial vehicle, which has a reduced weight. In addition, it is desirable to provide actuator systems for a flight control surface that has reduced maintenance time and complexity. Furthermore, other desirable features and characteristics of the present disclosure will become apparent from the subsequent detailed description and the appended claims, taken in conjunction with the accompanying drawings and the foregoing technical field and background.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

According to various embodiments, provided is an actuator system for a flight control surface of an aerial vehicle. The actuator system includes a shaft. The shaft includes at least one roller configured to rotate with the shaft and a plunger. The at least one roller includes a plurality of roller threads. The actuator system includes an inverted nut defining an inner bore including a plurality of nut threads. The inverted nut is coupled about the shaft such that the plurality of nut threads are configured to engage with the plurality of roller threads to move the inverted nut relative to the shaft. The inverted nut includes a source of a lubricant in fluid communication with the inner bore and the plunger is configured to be received within the inner bore to supply the lubricant to the at least one roller.

The inner bore further defines a lubricant reservoir in fluid communication with the source of the lubricant that is configured to receive the lubricant and at least one distribution channel in fluid communication with the lubricant reservoir. The plunger is configured to be received within the lubricant reservoir to distribute the lubricant to the at least one distribution channel to supply the lubricant to the at least one roller. The inverted nut includes an inlet bore in communication with a lubrication fitting, the lubrication fitting is the source of the lubricant, and the at least one distribution channel includes a first distribution channel in fluid communication with the inlet bore and at least one second distribution channel in fluid communication with the first distribution channel. The at least one second distribution channel includes a plurality of second distribution channels, the at least one roller includes a plurality of rollers, and each of the plurality of second distribution channels is associated with a respective one of the plurality of rollers. The first distribution channel is defined about an inner perimeter of the inner bore at a terminal end of the inner bore, and the at least one second distribution channel is defined axially to intersect at least a portion of the first distribution channel. The shaft has a first shaft end opposite a second shaft end, the at least one roller is coupled to the shaft proximate the second shaft end so as to be disposed between the first shaft end and the second shaft end, and the plunger is coupled to the second shaft end. The at least one roller includes a plurality of rollers each having the plurality of roller threads, the shaft further comprises an inverted roller screw that includes the plurality of rollers and the plunger extends axially outward from the inverted roller screw. The actuator system includes an actuator housing configured to be coupled to a frame of the aerial vehicle, the inverted nut defines an output rod having a coupling flange configured to be coupled to the flight control surface and the inverted nut is movable relative to the actuator housing.

Also provided is an actuator system for a flight control surface of an aerial vehicle. The actuator system includes an actuator housing having a first coupling flange configured to be coupled to the aerial vehicle, and a shaft disposed within the actuator housing. The shaft includes an inverted roller screw configured to rotate with the shaft. The inverted roller screw includes a plurality of rollers with each of the plurality of rollers including a plurality of roller threads. The actuator system includes an inverted nut defining an inner bore including a plurality of nut threads and a second coupling flange configured to be coupled to the flight control surface. The inverted nut is coupled about the shaft such that the plurality of nut threads are configured to engage with the plurality of roller threads to move the inverted nut relative to the actuator housing. The inverted nut includes a source of a lubricant in fluid communication with the inner bore and the inner bore is configured to supply the lubricant to the plurality of rollers.

The source of the lubricant is a lubrication fitting coupled to the inverted nut, and the inverted nut includes at least one distribution channel in fluid communication with the lubrication fitting and the inner bore to supply the lubricant to the inner bore. The at least one distribution channel includes a first distribution channel and at least one second distribution channel, the first distribution channel is defined about an inner perimeter of the inverted nut and the at least one second distribution channel is in fluid communication with the first distribution channel to supply the lubricant to the inner bore. The at least one second distribution channel comprises a plurality of second distribution channels spaced apart about the inner perimeter, with each of the plurality of second distribution channels associated with one of the plurality of rollers. Each of the plurality of second distribution channels intersects at least a portion of the first distribution channel to supply the lubricant to the inner bore. The shaft includes a plunger, the inverted nut further comprises a lubricant reservoir in fluid communication with the source of the lubricant, and the plunger is configured to be received within the lubricant reservoir to supply the lubricant to the plurality of rollers. The inverted nut includes an inlet bore in communication with a lubrication fitting, the lubrication fitting is the source of the lubricant, the inverted nut includes at least one distribution channel in fluid communication with the lubrication fitting, the at least one distribution channel includes a first distribution channel in fluid communication with the inlet bore and at least one second distribution channel in fluid communication with the first distribution channel. The at least one second distribution channel includes a plurality of second distribution channels, and each of the plurality of second distribution channels is associated with a respective one of the plurality of rollers. The first distribution channel is defined about an inner perimeter of the inner bore at a terminal end of the inner bore proximate the lubricant reservoir, and the at least one second distribution channel is defined axially to intersect at least a portion of the first distribution channel. The shaft has a first shaft end opposite a second shaft end, the inverted roller screw is coupled to the shaft proximate the second shaft end so as to be disposed between the first shaft end and the second shaft end, and the plunger is coupled to the second shaft end.

Further provided is an actuator system for a flight control surface of an aerial vehicle. The actuator system includes a motor, and an inner shaft. The inner shaft includes a first portion at a first end and a second portion that extends from the first portion to a second end of the inner shaft. The second end is opposite the first end. The first portion of the inner shaft is coupled to the motor and configured to be driven by the motor. The second portion of the inner shaft is coupled to at least one roller configured to rotate with the inner shaft. The at least one roller includes a plurality of roller threads. The actuator system includes an inverted nut defining an inner bore and having an outer diameter that defines an output rod. The inner bore includes a plurality of nut threads. The inverted nut is coupled about the inner shaft such that the plurality of nut threads are configured to engage with the plurality of roller threads to move the output rod relative to the inner shaft, and the output rod is configured to be coupled to the flight control surface. The actuator system includes an actuator housing that surrounds at least a portion of the inverted nut and the inner shaft, and the inverted nut is movable relative to the actuator housing. The motor includes a motor output shaft, a gearbox is coupled to the motor output shaft and coupled to the inner shaft, and the motor and the gearbox are disposed along a longitudinal axis of the actuator system. The motor is disposed along an axis that is offset from a longitudinal axis of the actuator system. The actuator system includes an actuator housing that surrounds at least a portion of the inverted nut, the actuator housing configured to be coupled to the aerial vehicle, and the actuator housing includes a wiper configured to remove debris from an outer surface of the inverted nut and a bushing. The actuator housing is configured to be coupled to a frame of the aerial vehicle. The actuator housing includes a first actuator housing and a second actuator housing, the first actuator housing is received within the second actuator housing and the first actuator housing surrounds at least a portion of the motor. The actuator housing includes a first actuator housing and a second actuator housing, and the first actuator housing is configured to be coupled to the frame. The at least one roller comprises a plurality of rollers that cooperate to define an inverted roller screw. The gearbox is a multi-stage planetary gear box. The actuator system includes a sensor configured to observe a rotation of the inner shaft or a rotation of the motor to determine a position of the inverted nut. The actuator system includes a sensor configured to observe a position of the inverted nut. The actuator system includes at least one thrust bearing coupled to the inner shaft.

Also provided is an actuator system for a flight control surface of an aerial vehicle. The actuator system includes a motor having a motor output shaft, and a gearbox coupled to the motor output shaft and coupled to an inner shaft. The actuator system includes the inner shaft including a first portion at a first end and a second portion that extends from the first portion to a second end of the inner shaft. The second end is opposite the first end. The first portion of the inner shaft is coupled to the gearbox and the inner shaft is configured to be driven by the gearbox. The second portion of the inner shaft includes an inverted screw with a plurality of rollers, and each of the plurality of rollers includes a plurality of roller threads. The actuator system includes an inverted nut defining an inner bore and having an outer diameter that defines an output rod. The inner bore includes a plurality of nut threads. The inverted nut is coupled about the inner shaft such that the plurality of nut threads are configured to engage with the plurality of roller threads to move the output rod relative to the inner shaft, and the output rod is configured to be coupled to the flight control surface. The actuator system includes an actuator housing that surrounds at least a portion of the inner shaft and the inverted nut. The inverted nut is movable relative to the actuator housing and the actuator housing is configured to be coupled to a frame of the aerial vehicle.

The motor and the gearbox are disposed along a longitudinal axis of the actuator system, and the gearbox is a planetary gear box. The motor is disposed along an axis that is offset from a longitudinal axis of the actuator system. The actuator housing includes a wiper configured to remove debris from an outer surface of the inverted nut and a bushing. The actuator housing includes a first actuator housing and a second actuator housing, the first actuator housing is received within the second actuator housing and the first actuator housing surrounds at least a portion of the gearbox and the motor. The actuator housing includes a first actuator housing and a second actuator housing, the first actuator housing surrounds at least a portion of the gearbox and the first actuator housing is configured to be coupled to the frame. The actuator system includes a sensor configured to observe a rotation of the inner shaft or a rotation of the motor to determine a position of the inverted nut, and at least one thrust bearing coupled to the inner shaft.

BRIEF DESCRIPTION OF DRAWINGS

The present disclosure will hereinafter be described in conjunction with the following drawing figures, wherein like numerals denote like elements, and wherein.

DETAILED DESCRIPTION

Figure 1:
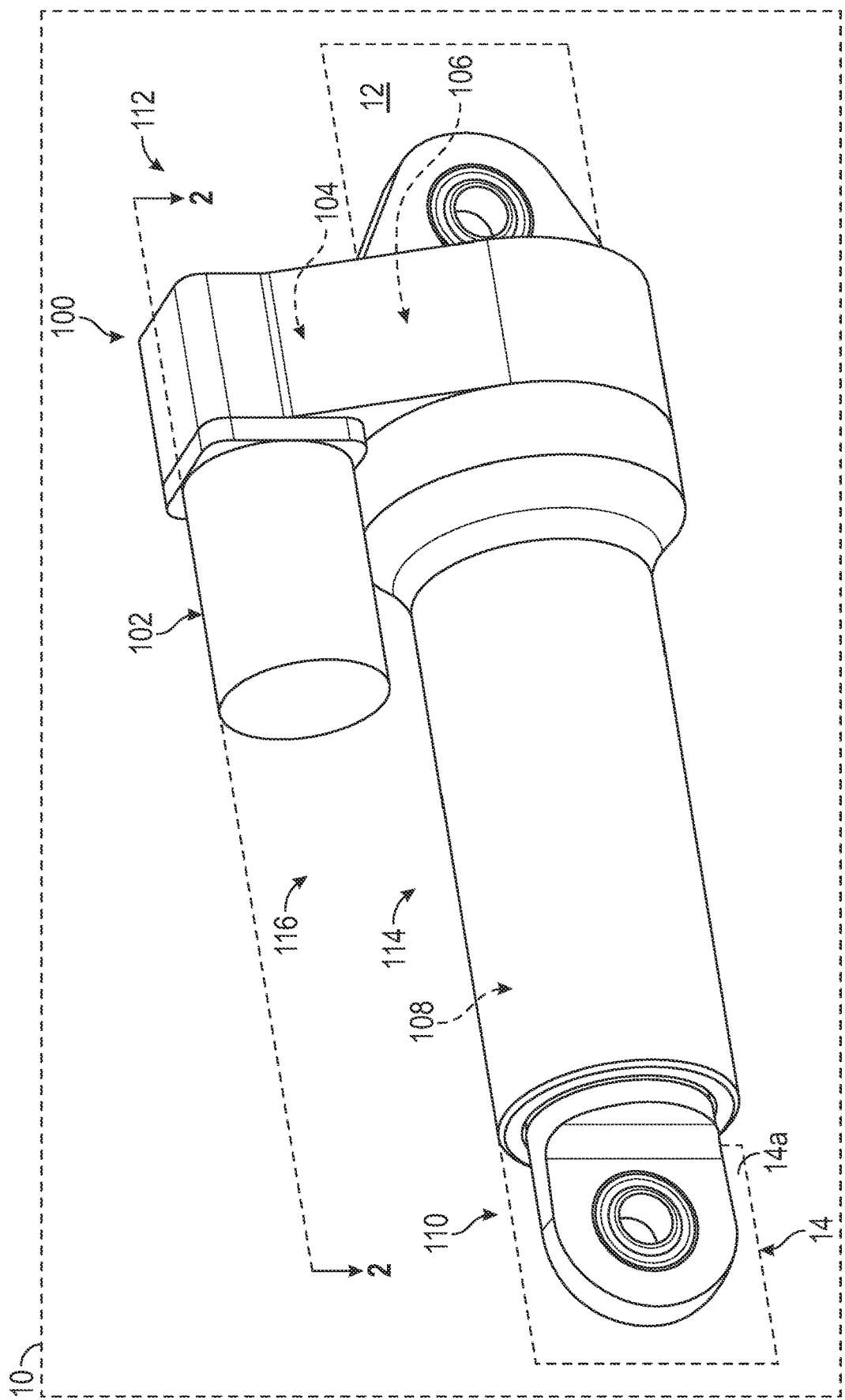
FIG. 1 is a schematic perspective view of an actuator system for a flight control surface associated with an aerial vehicle in a first, retracted position in accordance with the various teachings of the present disclosure.

The following detailed description is merely exemplary in nature and is not intended to limit the application and uses. Furthermore, there is no intention to be bound by any expressed or implied theory presented in the preceding technical field, background, brief summary or the following detailed description. In addition, those skilled in the art will appreciate that embodiments of the present disclosure may be practiced in conjunction with any type of device that would benefit from an actuator system to move an article and the actuator system described herein for use with a flight control surface is merely one exemplary embodiment according to the present disclosure. In addition, while the actuator system is described herein as being used with a vehicle, such as a bus, motorcycle, train, motor vehicle, marine vessel, aircraft, rotorcraft, unmanned aerial vehicle and the like, the various teachings of the present disclosure can be used with on a stationary platform. Further, it should be noted that many alternative or additional functional relationships or physical connections may be present in an embodiment of the present disclosure. In addition, while the figures shown herein depict an example with certain arrangements of elements, additional intervening elements, devices, features, or components may be present in an actual embodiment. It should also be understood that the drawings are merely illustrative and may not be drawn to scale.

As used herein, the term "axial" refers to a direction that is generally parallel to or coincident with an axis of rotation, axis of symmetry, or centerline of a component or components. For example, in a cylinder or disc with a centerline and generally circular ends or opposing faces, the "axial" direction may refer to the direction that generally extends in parallel to the centerline between the opposite ends or faces. In certain instances, the term "axial" may be utilized with respect to components that are not cylindrical (or otherwise radially symmetric). For example, the "axial" direction for a rectangular housing containing a rotating shaft may be viewed as a direction that is generally parallel to or coincident with the rotational axis of the shaft. Furthermore, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominantly in the respective nominal axial or radial direction. As used herein, the term "about" denotes within 10% to account for manufacturing tolerances. In addition, the term "substantially" denotes within 10% to account for manufacturing tolerances.

With reference to FIG. 1, a schematic illustration of an exemplary actuator system 100 for use with a vehicle 10, such as an aerial vehicle, is shown. The vehicle 10 includes, but is not limited to, an aircraft, a rotorcraft, unmanned aerial vehicle, etc. In this example, the vehicle 10 includes a support structure or frame 12 and a flight control surface 14. An actuator system 100 is coupled to the frame 12 and the flight control surface 14 to move or translate the flight control surface 14 relative to the frame 12. In one example, the flight control surface 14 is an aileron, however, the actuator system 100 may be used to move a rudder, elevator, etc. In addition, the actuator system 100 may be used in conjunction with another actuator system to move a flap. Moreover, while a single actuator system 100 is shown herein for use with the flight control surface 14, any number of actuator systems 100 may be employed depending on the length of the flight control surface, for example. In this example, the actuator system 100 is configured to move the flight control surface 14 between about 1 inch (in.) to about 20 inches (in.) relative to the frame 12; however, the actuator system 100 may be configured to move the flight control surface 14 about any desired range of motion that is typical for the particular primary flight control surface.

In one example, the actuator system 100 includes a motor 102, a gearbox 104, a sensor 106, a first or inner shaft 108 and an inverted nut 110. The gearbox 104, at least a portion of the motor 102 and at least a portion of the sensor 106 are disposed within or enclosed in a first actuator housing 112, and the inner shaft 108 is disposed within or enclosed in a second actuator housing 114. The first actuator housing 112 and the second actuator housing 114 cooperate to form an actuator housing 116. The first actuator housing 112 and the second actuator housing 114 may be composed of metal or metal alloy, and may be cast, forged, additively manufactured, etc. The first actuator housing 112 may be coupled to the second actuator housing 114 via welding, etc. It should be noted, however, that the first actuator housing 112 and the second actuator housing 114 may be integrally formed or one-piece. As will be discussed, the inverted nut 110 is movable relative to the actuator housing 116.

Figure 2:
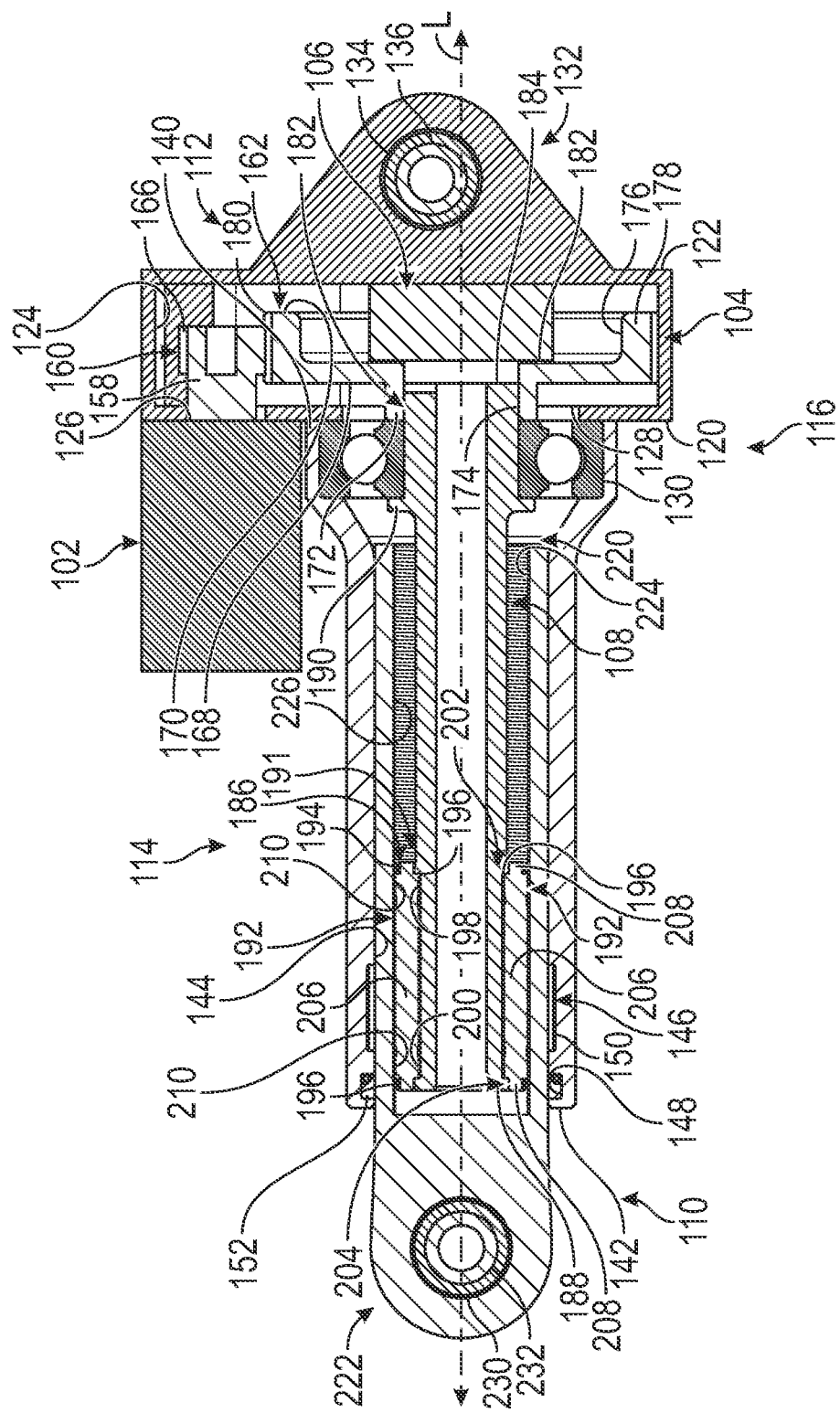
FIG. 2 is a cross-sectional view of the actuator system of FIG. 1, taken along line 2-2 of FIG. 1.

With reference to FIG. 2, the first actuator housing 112 includes a first housing end 120 opposite a second housing end 122, and a cavity 124 is defined between the first housing end 120 and the second housing end 122. The first housing end 120 is coupled to the second actuator housing 114. The first housing end 120 defines a first bore 126 and a second bore 128. The first bore 126 is defined proximate an outer perimeter of the first actuator housing 112, and is sized and shaped to receive a portion of the motor 102 therethrough. The first bore 126 is offset and spaced apart from the second bore 128. The second bore 128 is defined radially inward from the first bore 126, and is defined so as to be symmetric about a longitudinal axis L of the actuator system 100. The second bore 128 is sized and shaped to enable a portion of the gearbox 104 to engage with a portion of the inner shaft 108. The second bore 128 is also generally defined to assist in retaining a bearing 130 associated with the inner shaft 108. The cavity 124 is sized and shaped to receive and surround the gearbox 104, at least a portion of the motor 102 and at least a portion of the sensor 106. The first actuator housing 112 may also include one or more bores to enable a cable associated with the motor 102 and/or the sensor 106 to exit the first actuator housing 112.

The second housing end 122 includes a first coupling flange 132 that extends axially from the second housing end 122. The first coupling flange 132 is substantially triangular in shape, however, the first coupling flange 132 may have any desired shape. The first coupling flange 132 defines a first bore 134 proximate an apex of the first coupling flange 132. The first bore 134 is defined along an axis substantially perpendicular to the longitudinal axis L. In one example, the axis of the first bore 134 is offset from the longitudinal axis L. A first coupling bearing 136 is received within and coupled to the first bore 134. In one example, the first coupling bearing 136 is a spherical bearing, however, any suitable bearing may be employed. The first coupling bearing 136 receives a mechanical fastener, such as a pin, bolt, etc., to couple the first actuator housing 112, and thus, the actuator system 100 to the frame 12 of the vehicle 10. In one example, the first coupling bearing 136 receives a pin, which couples the first actuator housing 112 to a fork mount coupled to the frame 12. It should be noted that the first actuator housing 112 may be coupled to the frame 12 via any suitable technique, including, but not limited to the fork mount illustrated herein, a trunnion, a pin-to-pin mount, a reaction/kick link mount, a flange mount, etc.

The second actuator housing 114 includes a third housing end 140 opposite a fourth housing end 142, and a housing bore 144 that extends from the third housing end 140 to the fourth housing end 142. The third housing end 140 is coupled to the first housing end 120 of the first actuator housing 112. The second actuator housing 114 is substantially circular proximate the third housing end 140 to receive the bearing 130. The second actuator housing 114 tapers from proximate the third housing end 140 to the fourth housing end 142. The second actuator housing 114 is substantially cylindrical from the fourth housing end 142 to proximate the third housing end 140. The housing bore 144 is defined to receive the bearing 130, the inner shaft 108 and a portion of the inverted nut 110. The housing bore 144 includes a first inner slot 146 and a second inner slot 148. The first inner slot 146 is spaced axially apart from the second inner slot 148. The first inner slot 146 and the second inner slot 148 are defined to extend about the inner perimeter or circumference of the second actuator housing 114. The first inner slot 146 is sized to receive a bushing 150. The bushing 150 supports the movement of the inverted nut 110 relative to the second actuator housing 114. In this regard, the bushing 150 guides the movement of the inverted nut 110 and also reduces friction between the second actuator housing 114 and the inverted nut 110. The second inner slot 148 is defined proximate the fourth housing end 142. The second inner slot 148 receives a wiper or scraper 152. The scraper 152 may be composed of a polymer-based material, and may be coupled to the second inner slot 148 so as to be flush with or planar with an interior surface 144a of the housing bore 144. The scraper 152 removes debris, such as dirt, lubricant, ice, snow, etc., from the inverted nut 110 as the inverted nut 110 moves relative to the second actuator housing 114. The scraper 152 may be energized by an O-ring or a metal spring.

The motor 102 is coupled to the gearbox 104. The motor 102 includes, but is not limited to an electric motor, a hydraulic motor, etc. In one example, the motor 102 is an electric motor, such as a direct current (DC) motor. The motor 102 is in communication with a power supply associated with the vehicle 10 (FIG. 1) over a suitable communication architecture that facilitates the transfer of power. The power supply includes, but is not limited to one or more batteries associated with the vehicle 10. The motor 102 includes an output shaft 158, which is coupled to the gearbox 104. The motor 102 is operable to drive or rotate the output shaft 158, which in turn, drives the gearbox 104. The motor 102 may be in communication with a controller associated with the vehicle 10 over a suitable communication architecture that facilitates the transfer of power, data, commands, etc. such as a bus. The motor 102 may be responsive to one or more control signals received from the controller associated with the vehicle 10 to drive or rotate the output shaft 158 to drive the gearbox 104. In this example, the motor 102 is arranged along an axis that is parallel to, but offset from, a longitudinal axis L of the actuator system 100.

Figure 3:
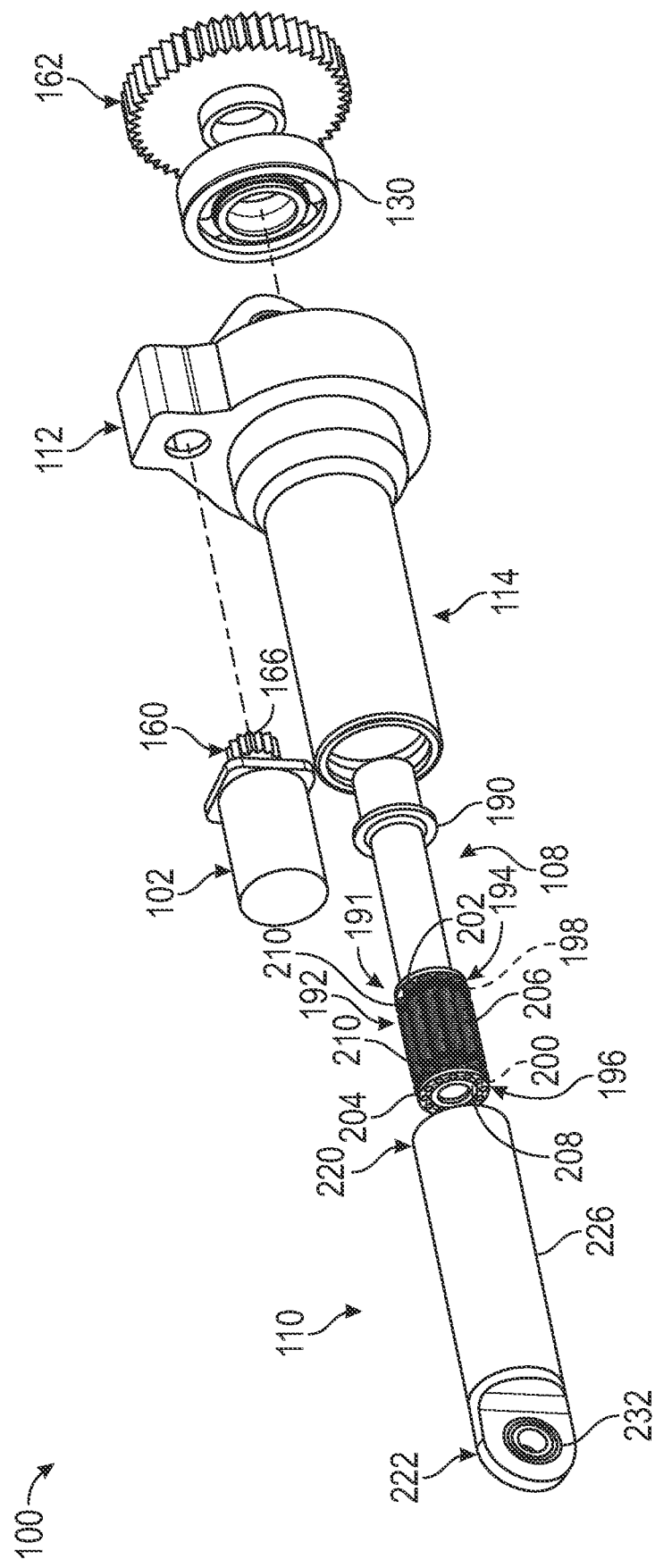
FIG. 3 is an exploded view of the actuator system of FIG. 1.

In one example, the gearbox 104 includes a first gear 160 and a second gear 162. With reference to FIG. 3, the first gear 160 is coupled to the output shaft 158 of the motor 102, via splines, for example, and is driven by the output shaft 158. In this example, the first gear 160 is a spur gear, which includes a plurality of spur gear teeth 166 defined about an outer perimeter or circumference of the first gear 160. The first gear 160 has a diameter, which is different and less than a diameter of the second gear 162. With reference back to FIG. 2, the second gear 162 is a spur gear, and has a first side 168 opposite a second side 170. The first side 168 includes a collar 172 that surrounds a bore 174. The collar 172 extends axially from the first side 168 and couples the second gear 162 to the inner shaft 108. In one example, the collar 172 is sized to be received about an outer perimeter or circumference of the inner shaft 108 such that the inner shaft 108 is positioned within the bore 174, but in other examples, the collar 172 may be received within the inner shaft 108.

The collar 172 may be coupled to the inner shaft 108 via pins, splines, welding, press-fit, etc. It should be noted that the second gear 162 may also be machined onto the inner shaft 108. Generally, the collar 172 is coupled to the inner shaft 108 such that the inner shaft 108 rotates with the second gear 162. The second side 170 defines a counterbore 176, which is in communication with the bore 174. At least a portion of the sensor 106 is received within the counterbore 176, which enables a reduction in an axial length of the second actuator housing 114. A rim 178 is defined about an outer perimeter or circumference of the second gear 162 and extends from the first side 168 to the second side 170. A plurality of second spur gear teeth 180 are defined on the rim 178. The plurality of second spur gear teeth 180 engage with the plurality of spur gear teeth 166 of the first gear 160, and the second gear 162 is driven by the first gear 160.

The sensor 106 observes a rotation of the inner shaft 108, and generates sensor signals based the observation. The sensor 106 may be in communication with the controller associated with the vehicle 10, or with a controller associated with the actuator system 100 via a suitable communication architecture that facilitates the transfer of data, power, etc., such as a bus. In one example, sensor 106 is a rotary variable differential transformer (RVDT) sensor, which observes a first portion 182 of the inner shaft 108. As the position of the inner shaft 108 is directly proportional to the position of the inverted nut 110, generally, the position of the inverted nut 110 may be determined based on the sensor signals from the sensor 106.

The inner shaft 108 includes the first portion 182 at a first end 184, and a second portion 186 at a second end 188. The first end 184 is opposite second end 188. The inner shaft 108 is composed of metal or metal alloy, and may be cast, forged, additively manufactured, etc. In this example, the inner shaft 108 is hollow from the first end 184 to the second end 188. The first end 184 of the inner shaft 108 is received within and coupled to the second gear 162 such that the inner shaft 108 is driven by the gearbox 104. The first portion 182 of the inner shaft 108 is coupled to the bearing 130. In one example, the first portion 182 includes a flange 190 proximate, but spaced apart from the first end 184, which assists in retaining the bearing 130 about the inner shaft 108. In one example, the bearing 130 is a thrust bearing, and supports the inner shaft 108. The bearing 130 is retained between the collar 172 and the first side 168 of the second gear 162.

In this example, the second portion 186 of the inner shaft 108 extends from the first portion 182 to the second end 188 of the inner shaft 108. The inner shaft 108 is substantially cylindrical between the first portion 182 and the second portion 186. The second portion 186 includes an inverted roller screw 191. With reference to FIG. 3, generally, the inverted roller screw 191 includes a plurality of rollers 192, a first roller guide 194, a second roller guide 196, a first toothed section 198 and a second toothed section 200. The rollers 192 extend axially along the second portion 186 to the second end 188. Each of the rollers 192 is cylindrical, and has a first roller end 202 opposite a second roller end 204, and includes a plurality of roller threads 206 defined between the first roller end 202 and the second roller end 204. The roller threads 206 cooperate with the inverted nut 110 to move the inverted nut 110 relative to the inner shaft 108. In one example, the inverted roller screw 191 includes about 8 to about 14 rollers 192, which are spaced apart about the outer perimeter or circumference of the inner shaft 108.

The first roller end 202 and the second roller end 204 each include a post 208 (FIG. 2) and a plurality of roller gear teeth 210. The post 208 extends axially outward from the respective one of the first roller end 202 and the second roller end 204. The plurality of roller gear teeth 210 are defined about an outer perimeter or circumference of each roller 192 at the respective one of the first roller end 202 and the second roller end 204. The roller gear teeth 210 each engage with a respective one of the first toothed section 198 and the second toothed section 200. The first roller guide 194 is retained about the second portion 186 by a retaining ring, for example. The first roller guide 194 defines a plurality of spaced apart bores. Each of the bores receives the post 208 associated with the first roller end 202 of a respective roller 192 to guide the respective roller 192 as the roller 192 rotates relative to the inner shaft 108. The second roller guide 196 is retained about the second portion 186 at the second end 188 by a retaining ring, for example. The second roller guide 196 defines a plurality of spaced apart bores. Each of the bores receives the post 208 associated with the second roller end 204 of a respective roller 192 to guide the respective roller 192 as the roller 192 rotates relative to the inner shaft 108. The first toothed section 198 is defined about the outer perimeter or circumference of the inner shaft 108 along the second portion 186 proximate or adjacent to the first roller guide 194. The first toothed section 198 has a plurality of teeth, which engage or mesh with the roller gear teeth 210 at the first roller end 202. The second toothed section 200 is defined about the outer perimeter or circumference of the inner shaft 108 along the second portion 186 proximate or adjacent to the second roller guide 196. The second toothed section 200 has a plurality of teeth, which engage or mesh with the roller gear teeth 210 at the second roller end 204.

Thus, generally, the rollers 192 are coupled to the inner shaft 108 to rotate with the inner shaft 108. The rotation of the inner shaft 108 rotates the rollers 192, which are coupled to or engaged with the inverted nut 110. The rotation of the rollers 192 causes a translation of the inverted nut 110 relative to the inner shaft 108. The engagement of the roller gear teeth 210 with the first toothed section 198 and the second toothed section 200 enable the rollers 192 to rotate relative to the inner shaft 108 to drive or move the inverted nut 110 during the rotation of the inner shaft 108.

With reference back to FIG. 2, the inverted nut 110 cooperates with the inverted roller screw 191 to enable a movement or translation of the inverted nut 110 relative to the inner shaft 108 and the actuator housing 116. The inverted nut 110 is composed of a metal or metal alloy, and may be cast, forged, additively manufactured, etc. In this example, the inverted nut 110 defines an output rod and includes a first nut end 220 opposite a second nut end 222. The first nut end 220 defines an inner bore or counterbore 224, which extends from the first nut end 220 to proximate the second nut end 222. The counterbore 224 includes a plurality of nut threads 226, which engage or mesh with the roller threads 206. The nut threads 226 are defined about the perimeter or circumference of the counterbore 224 and extend axially for a length of the counterbore 224. Thus, in this example, a length of travel of the inverted nut 110 is about equal to a length of the counterbore 224. In other embodiments, the nut threads 226 may extend for a length that is different and less than a length of the counterbore 224 to enable a predetermined amount of travel of the inverted nut 110.

The second nut end 222 defines a second coupling flange, which includes a second bore 230. The second bore 230 is defined along an axis substantially perpendicular to the longitudinal axis L. A second coupling bearing 232 is received within and coupled to the second bore 230. In one example, the second coupling bearing 232 is a spherical bearing, however, any suitable bearing may be employed. The second coupling bearing 232 receives a mechanical fastener, such as a pin, bolt, etc., to couple the inverted nut 110 or output rod, and thus, the actuator system 100 to the flight control surface 14 of the vehicle 10. In one example, the second coupling bearing 232 receives a pin, which couples the inverted nut 110 to a fork mount coupled to the flight control surface 14. It should be noted that the inverted nut 110 may be coupled to the flight control surface 14 via any suitable technique, including, but not limited to the fork mount illustrated herein, a trunnion, a pin-to-pin mount, a reaction/kick link mount, a flange mount, etc. In this example, the fork mount includes two guides 14a. The guides 14a provide external anti-rotation to the actuator system 100, and ensure that the inverted nut 110 translates substantially linearly without rotation. It should be noted that in other embodiments, the actuator system 100 may include an internal anti-rotation structure, such as a rail and a groove, etc. Further, the use of the guides 14a is merely an example, as the vehicle 10 may include another structure that ensures the translation of the inverted nut 110 with substantially no rotation.

In one example, in order to assemble the actuator system 100, the first gear 160 is coupled to the output shaft 158 of the motor 102. The rollers 192 are coupled to the first roller guide 194 and the second roller guide 196 so that the respective roller gear teeth 210 engage with each of the first toothed section 198 and the second toothed section 200. The inverted nut 110 is coupled about the inverted roller screw 191 such that the nut threads 226 engage with the roller threads 206. The bearing 130 is coupled to the first end 184 of the inner shaft 108, and with the scraper 152 and the bushing 150 coupled to the second actuator housing 114, the second actuator housing 114 is coupled about a portion of the inverted nut 110. The second gear 162 is coupled to the inner shaft 108, and the sensor 106 is coupled to the second gear 162. The first actuator housing 112 is positioned about the second gear 162 and the sensor 106, and the motor 102 is coupled to the first actuator housing 112 so that the first gear 160 is engaged with the second gear 162. With the actuator system 100 assembled, the first coupling bearing 136 is coupled to the frame 12 of the vehicle 10, and the second coupling bearing 232 is coupled to the flight control surface 14 of the vehicle 10.

Figure 4:
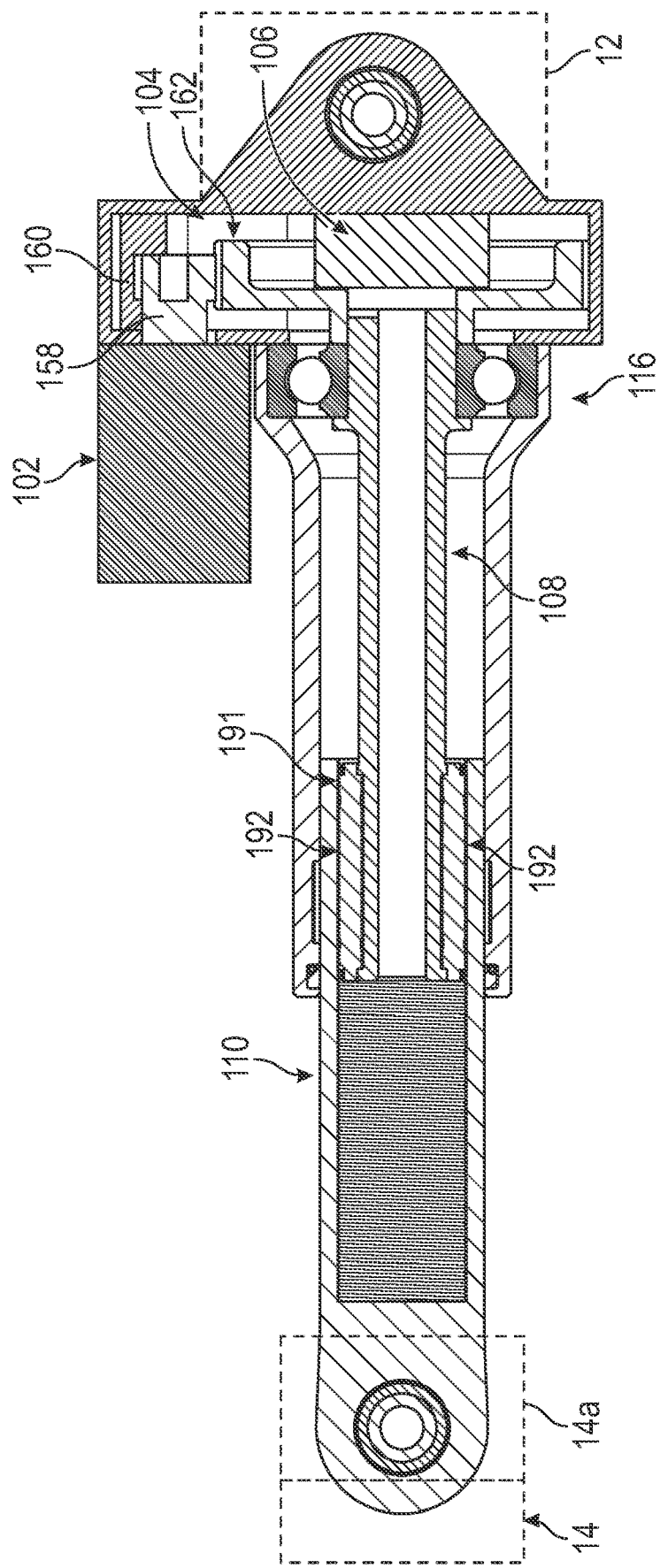
FIG. 4 is a cross-sectional view of the actuator system of FIG. 1, taken from the perspective of line 2-2 of FIG. 1, in which the actuator system is in a second, extended position.

With reference to FIG. 1, the output rod or inverted nut 110 is in a first, retracted position. In order to move to a second, extended position as shown in FIG. 4 or positions in-between the first position and the second position, generally, with reference to FIG. 4, the motor 102 is actuated, via one or more control signals received from the controller associated with the vehicle 10 for example, which causes the first gear 160 to rotate. The rotation of the first gear 160 drives the second gear 162, which in turn, drives or rotates the inner shaft 108. The rotation of the inner shaft 108 moves or rotates the rollers 192 of the inverted roller screw 191, which causes the inverted nut 110 to translate. Generally, the engagement of the nut threads 226 with the roller threads 206 enable a movement or translation of the output rod or inverted nut 110 relative to the inner shaft 108 and the actuator housing 116, which moves the flight control surface 14 relative to the frame 12. The sensor 106 observes the rotation of the inner shaft 108, and communicates the sensor signals to the controller of the vehicle 10, for example, to determine the position of the inverted nut 110.

Figure 5:
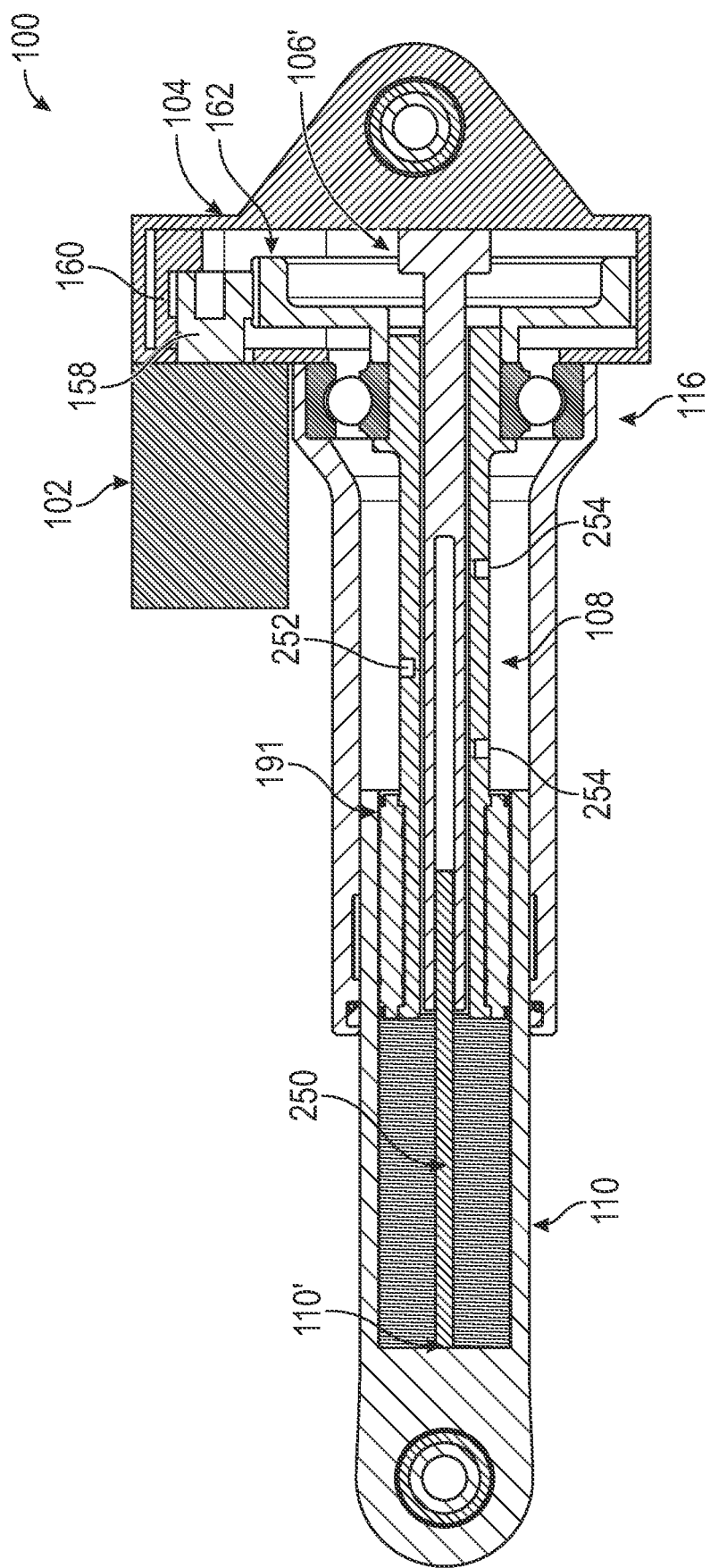
FIG. 5 is a cross-sectional view of another actuator system for the flight control surface associated with the aerial vehicle in the second, extended position in accordance with the various teachings of the present disclosure.

In addition, it should be noted that while the sensor 106 is shown in FIGS. 1-4 as comprising a RVDT sensor, in other embodiments, the sensor 106 may be configured differently to observe a movement of the inner shaft 108. For example, with reference to FIG. 5, a sensor 106' is shown for use with the actuator system 100 (FIG. 1). In this example, the sensor 106' is a linear variable differential transformer (LVDT) sensor, which includes a core shaft 250. The core shaft 250 is coupled to a terminal end 110a of the inverted nut 110. The core shaft 250 is movable relative to at least a primary coil 252 and a pair of secondary coils 254 to generate a sensor signal, which correlates to a position of the inverted nut 110. Thus, generally, the sensor 106' observes a position of the inverted nut 110 and generates sensor signals based on the observation. The sensor 106' may be in communication with the controller associated with the vehicle 10, or with a controller associated with the actuator system 100 via a suitable communication architecture that facilitates the transfer of data, power, etc., such as a bus.

In addition, it should be noted that while the actuator system 100 is shown in FIGS. 1-5 as comprising a motor 102 that is offset from the inner shaft 108, an actuator system may be configured differently to move the flight control surface 14 relative to the frame 12. For example, with reference to FIG. 6, an actuator system 300 is shown for use with the vehicle 10. As the actuator system 300 includes components that are the same or similar to components of the actuator system 300 discussed with regard to FIGS. 1-5, the same reference numerals will be used to denote the same or similar components. In one example, with additional reference to FIG. 7, the actuator system 300 includes a motor 302, a gearbox 304, a sensor 306, a first or inner shaft 308 and the inverted nut 110. In this example, the motor 302 and the gearbox 304 are disposed or arranged along a longitudinal axis L3 of the actuator system 300. The gearbox 304, at least a portion of the motor 302 and at least a portion of the sensor 306 are disposed within or enclosed in a first actuator housing 312, and the inner shaft 308 is disposed within or enclosed in a second actuator housing 314. In this example, the first actuator housing 312 is nested within the second actuator housing 314 and the first actuator housing 312 and the second actuator housing 314 cooperate to form an actuator housing 316. The first actuator housing 312 and the second actuator housing 314 may be composed of metal or metal alloy, and may be cast, forged, additively manufactured, etc. The first actuator housing 312 may be positioned within and coupled to the second actuator housing 314 via welding, etc. It should be noted, however, that the first actuator housing 312 and the second actuator housing 314 may be integrally formed or one-piece. As will be discussed, the inverted nut 110 is movable relative to the actuator housing 316.

Figure 7:
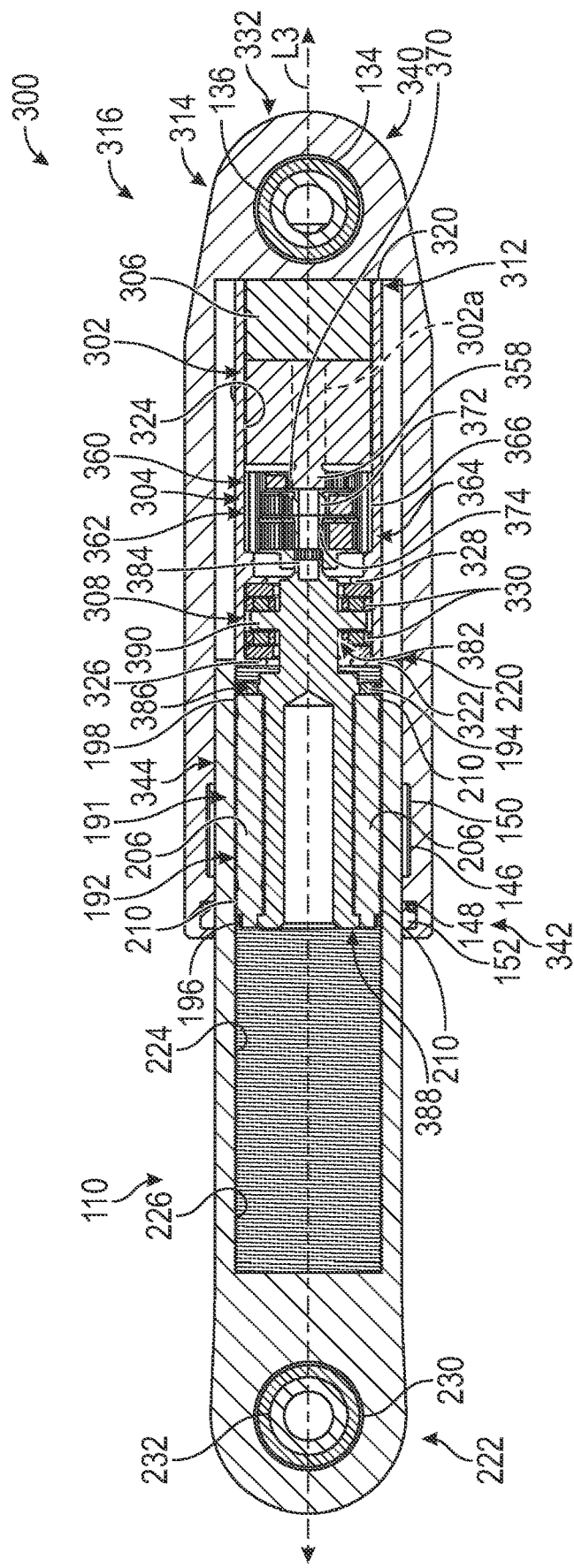
FIG. 7 is a cross-sectional view of the actuator system of FIG. 6, taken along line 7-7 of FIG. 6.

With reference to FIG. 7, the first actuator housing 312 includes a first housing end 320 opposite a second housing end 322, and a housing bore 324 is defined to extend from the first housing end 320 to the second housing end 322. The first housing end 320 is coupled to the second actuator housing 314. The second housing end 322 is adjacent or proximate the inverted nut 110 when the actuator system 300 is in the first, retracted position. The second housing end 322 includes a radial flange 326, which extends inward to assist in retaining one of a pair of bearings 330 associated with the inner shaft 308. The housing bore 324 receives the sensor 306, the motor 302, the gearbox 304, the pair of bearings 330 and a portion of the inner shaft 308. In one example, the housing bore 324 includes a second radial flange 328, which extends radially inward to assist in retaining the other bearing 330 of the pair of bearings 330.

The second actuator housing 314 includes a third housing end 340 opposite a fourth housing end 342, and a housing counterbore 344 that extends from the third housing end 340 to the fourth housing end 342. The first housing end 320 of the first actuator housing 312 is positioned within the housing counterbore 344 and coupled to the second actuator housing 314 proximate the third housing end 340. In one example, with reference to FIG. 8, one or more bores 341 are defined through the second actuator housing 314 proximate the third housing end 340 to enable cables associated with the motor 302 and/or sensor 306 to exit the second actuator housing 314. With reference back to FIG. 7, the second actuator housing 314 is substantially cylindrical from the third housing end 340 to the fourth housing end 342. The third housing end 340 includes a first coupling flange 332 that extends axially from the third housing end 340. The first coupling flange 332 defines a first bore 334 along an axis substantially perpendicular to a longitudinal axis L3 of the actuator system 300. The first coupling bearing 136 is received within and coupled to the first bore 334. The first coupling bearing 136 receives a mechanical fastener, such as a pin, a bolt, etc., to couple the second actuator housing 314, and thus, the actuator system 300 to the frame 12 of the vehicle 10. It should be noted that the second actuator housing 314 may be coupled to the frame 12 via any suitable technique, including, but not limited to the fork mount illustrated herein, a trunnion, a pin-to-pin mount, a reaction/kick link mount, a flange mount, etc.

The housing counterbore 344 is defined to receive the first actuator housing 312 and a portion of the inverted nut 110. The housing counterbore 344 includes the first inner slot 146 and the second inner slot 148. The first inner slot 146 and the second inner slot 148 are defined to extend about the inner perimeter or circumference of the second actuator housing 114. The first inner slot 146 is sized to receive the bushing 150. The second inner slot 148 is defined proximate the fourth housing end 342. The second inner slot 148 receives the wiper or scraper 152.

The motor 302 is coupled to the gearbox 304. The motor 302 includes, but is not limited to an electric motor, a hydraulic motor, etc. In one example, the motor 302 is an electric motor, such as a direct current (DC) motor, however, the motor 302 may comprise any suitable motor. The motor 302 is in communication with a power supply associated with the vehicle 10 (FIG. 6) over a suitable communication architecture that facilitates the transfer of power. The power supply includes, but is not limited to one or more batteries associated with the vehicle 10. The motor 302 includes an output shaft 358, which is coupled to the gearbox 304. The motor 302 is operable to drive or rotate the output shaft 358, which in turn, drives the gearbox 304. The motor 302 may be in communication with a controller associated with the vehicle 10 over a suitable communication architecture that facilitates the transfer of power, data, commands, etc. such as a bus. The motor 302 may be responsive to one or more control signals received from the controller associated with the vehicle 10 to drive or rotate the output shaft 358 to drive the gearbox 304.

In one example, the gearbox 304 comprises a single or a multistage planetary gearbox. In this example, the gearbox 304 is a multistage planetary gearbox and includes a first planetary stage 360, a second planetary stage 362, a third planetary stage 364 and a common ring gear 366. With reference to FIG. 7, a sun gear 370 is coupled to the output shaft 358 and the sun gear 370 is driven by the output shaft 358. The sun gear 370 is coupled to the output shaft 358 via splines for example. It should be noted that the sun gear 370 may also be machined directly onto the output shaft 358 of the motor 302. The first planetary stage 360 includes at least a first sun gear 372, which drives the second planetary stage 362. In one example, the first sun gear 372 may be integrally formed with or machined directly onto a carrier associated with the second planetary stage 362. The second planetary stage 362 includes at least a second sun gear 374, which drives the third planetary stage 364. In one example, the second sun gear 374 may be integrally formed with or machined directly onto a carrier associated with the third planetary stage 364. The third planetary stage 364 includes an output 376, which is coupled to the inner shaft 308 so as to drive the inner shaft 308.

The sensor 306 observes a rotation of a portion of the motor 302, and generates sensor signals based the observation. The sensor 306 may be in communication with the controller associated with the vehicle 10, or with a controller associated with the actuator system 300 via a suitable communication architecture that facilitates the transfer of data, power, etc., such as a bus. In one example, sensor 306 is a rotary variable differential transformer (RVDT) sensor, which observes a rotor 302a of the motor 302. It should be noted that a hall effect sensor, a resolver, etc. may also be employed. Generally, as the position of the rotor 302a of the motor 302 is directly proportional to the position of the inverted nut 110, the position of the inverted nut 110 may be determined based on the sensor signals from the sensor 306.

The inner shaft 308 includes a first portion 382 at a first end 384, and a second portion 386 at a second end 388. The first end 384 is opposite the second end 388. The inner shaft 308 is composed of metal or metal alloy, and may be cast, forged, additively manufactured, etc. The first end 384 of the inner shaft 308 is received within and coupled to the output 376 of the third planetary stage 364 such that the inner shaft 308 is driven by the gearbox 304. The first portion 382 of the inner shaft 308 is coupled to the bearings 330. In one example, the first portion 382 includes a flange 390 proximate, but spaced apart from the first end 384, which assists in positioning the bearings 330 within the radial flange 326 of the first actuator housing 312. In one example, the bearings 330 are each thrust bearings, and each of the bearings 330 support the inner shaft 308. The bearings 330 are retained within the first actuator housing 312 on opposed sides of the flange 390.

Figure 8:
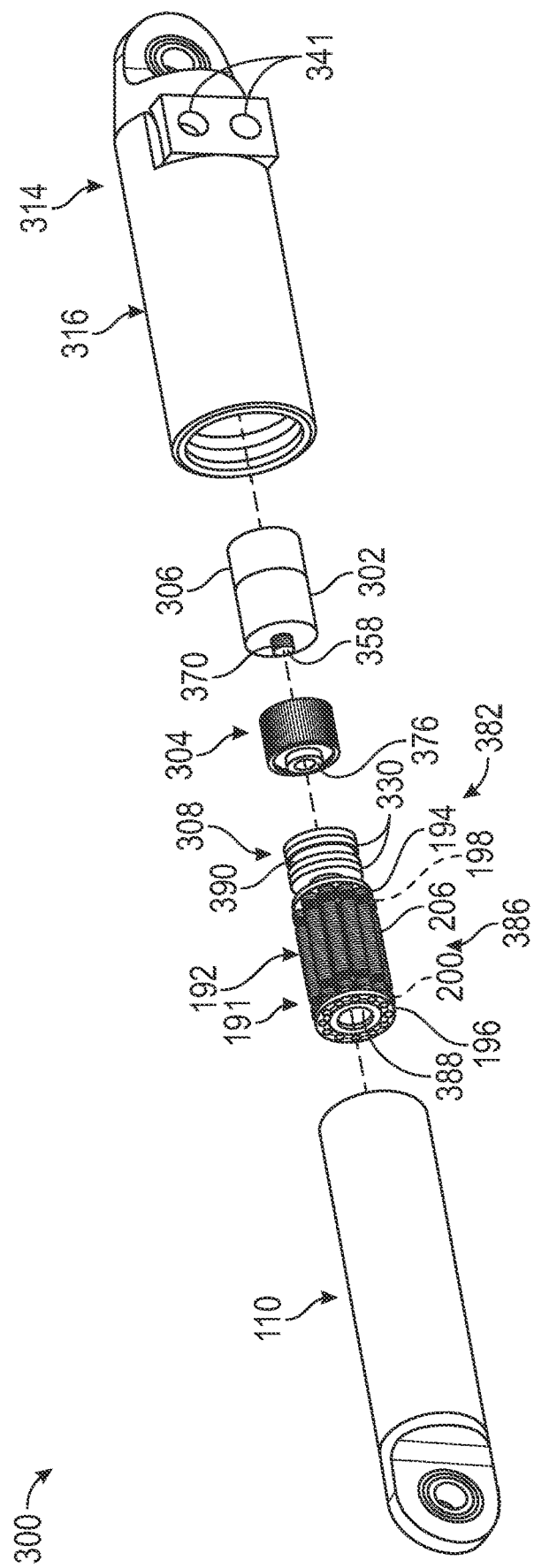
FIG. 8 is an exploded view of the actuator system of FIG. 6.

In this example, the second portion 386 of the inner shaft 308 is substantially cylindrical and hollow in order to reduce a weight of the actuator system 300. The second portion 386 extends from the first portion 382 to the second end 388 of the inner shaft 308. The second portion 386 includes the inverted roller screw 191. With reference to FIG. 8, as discussed, the inverted roller screw 191 includes the plurality of rollers 192, the first roller guide 194, the second roller guide 196, the first toothed section 198 and the second toothed section 200. The rollers 192 extend axially along the second portion 386 to the second end 388. The first roller guide 194 is retained about the second portion 386 by a retaining ring, for example. The first roller guide 194 guides the respective roller 192 as the roller 192 rotates relative to the inner shaft 308. The second roller guide 196 is retained about the second portion 386 at the second end 388 by a retaining ring, for example. The second roller guide 196 guides the respective roller 192 as the roller 192 rotates relative to the inner shaft 308. The first toothed section 198 is defined about the outer perimeter or circumference of the inner shaft 308 along the second portion 386 proximate or adjacent to the first roller guide 194. The second toothed section 200 is defined about the outer perimeter or circumference of the inner shaft 308 along the second portion 386 proximate or adjacent to the second roller guide 196.

Thus, generally, the rollers 192 are coupled to the inner shaft 308 to rotate with the inner shaft 308. The rotation of the inner shaft 308 rotates the rollers 192, which are coupled to or engaged with the inverted nut 110. The rotation of the rollers 192 causes a translation of the inverted nut 110 relative to the inner shaft 308. The engagement of the roller gear teeth 210 with the first toothed section 198 and the second toothed section 200 enable the rollers 192 to rotate relative to the inner shaft 308 to drive or move the inverted nut 110 during the rotation of the inner shaft 308.

With reference back to FIG. 7, the inverted nut 110 cooperates with the inverted roller screw 191 to enable a movement or translation of the inverted nut 110 relative to the inner shaft 308 and the actuator housing 316. As discussed, the inverted nut 110 defines an output rod and includes the first nut end 220 opposite the second nut end 222. The first nut end 220 defines the counterbore 224, which extends from the first nut end 220 to proximate the second nut end 222. The counterbore 224 includes the plurality of nut threads 226, which engage or mesh with the roller threads 206. The nut threads 226 are defined about the perimeter or circumference of the counterbore 224 and extend axially for a length of the counterbore 224. Thus, in this example, a length of travel of the inverted nut 110 is about equal to a length of the counterbore 224. In other embodiments, the nut threads 226 may extend for a length that is different and less than a length of the counterbore 224 to enable a predetermined amount of travel of the inverted nut 110.

Figure 6:
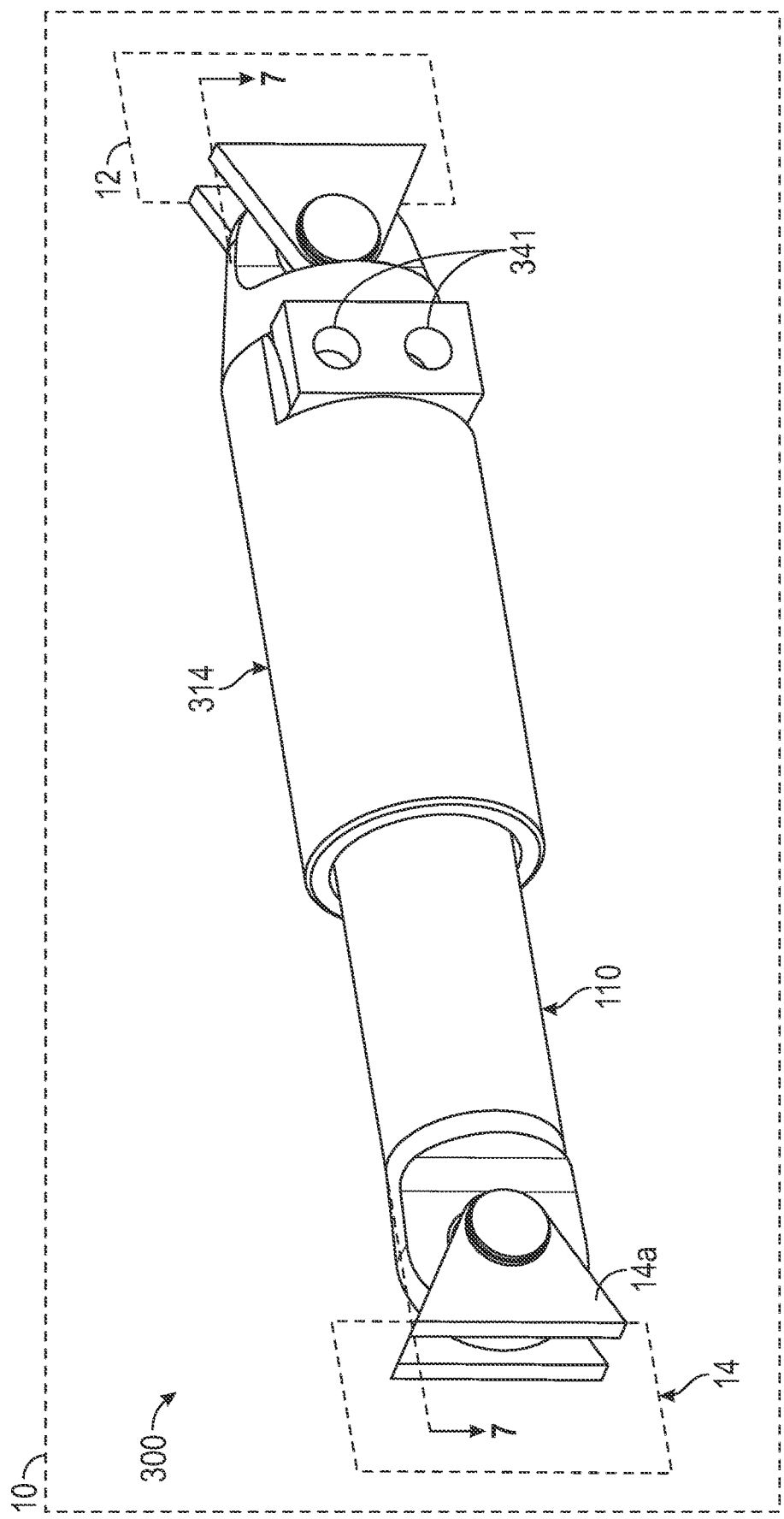
FIG. 6 is a schematic perspective view of another exemplary actuator system for the flight control surface associated with the aerial vehicle in a second, extended position in accordance with the various teachings of the present disclosure.

The second nut end 222 defines the second coupling flange, which includes a second bore 230. The second bore 230 is defined along an axis substantially perpendicular to the longitudinal axis L3. The second coupling bearing 232 is received within and coupled to the second bore 230. The second coupling bearing 232 receives a mechanical fastener, such as a pin, bolt, etc. to couple the inverted nut 110 or output rod, and thus, the actuator system 300 to the flight control surface 14 of the vehicle 10 (FIG. 6). In one example, the second coupling bearing 232 receives a pin, which couples the inverted nut 110 to a fork mount coupled to the flight control surface 14. It should be noted that the inverted nut 110 may be coupled to the flight control surface 14 via any suitable technique, including, but not limited to the fork mount illustrated herein, a trunnion, a pin-to-pin mount, a reaction/kick link mount, a flange mount, etc. In this example, the fork mount includes two guides 14a. The guides 14a provide external anti-rotation to the actuator system 100, and ensure that the inverted nut 110 translates substantially linearly without rotation. It should be noted that in other embodiments, the actuator system 100 may include an internal anti-rotation structure, such as a rail and a groove, etc. Further, the use of the guides 14a is merely an example, as the vehicle 10 may include another structure that ensures the translation of the inverted nut 110 with substantially no rotation.

In one example, in order to assemble the actuator system 300, with the first planetary stage 360, the second planetary stage 362 and the third planetary stage 364 assembled together, the sun gear 370 is coupled to the output shaft 358 of the motor 302. The sensor 306, the motor 302 and the gearbox 304 are coupled to the first actuator housing 312. The rollers 192 are coupled to the first roller guide 194 and the second roller guide 196 so that the respective roller gear teeth 210 engage with each of the first toothed section 198 and the second toothed section 200. The inverted nut 110 is coupled about the inverted roller screw 191 such that the nut threads 226 engage with the roller threads 206. The bearings 330 are each coupled to the first end 384 of the inner shaft 308, and the inner shaft 308 is coupled to the first actuator housing 312. With the scraper 152 and the bushing 150 coupled to the second actuator housing 314, the second actuator housing 314 is coupled about the first actuator housing 312 and a portion of the inverted nut 110. With the actuator system 300 assembled, the first coupling bearing 136 is coupled to the frame 12 of the vehicle 10, and the second coupling bearing 232 is coupled to the flight control surface 14 of the vehicle 10 (FIG. 6).

With reference to FIG. 6, the output rod or inverted nut 110 is shown in a second, extended position. In order to move to a first, retracted position or positions in-between the first position and the second position, generally, the motor 302 is actuated, via one or more control signals received from the controller associated with the vehicle 10 for example, which causes the sun gear 370 to rotate. The rotation of the sun gear 370 drives the first planetary stage 360, which in turn, drives or rotates the second planetary stage 362 via the first sun gear 372. The second planetary stage 362 drives or rotates the second sun gear 374, which in turn, drives or rotates the third planetary stage 364. The rotation of the third planetary stage 364 drives the output 376, which in turn, drives the inner shaft 308. The rotation of the inner shaft 308 moves or rotates the rollers 192 of the inverted roller screw 191, which causes the inverted nut 110 to rotate. Generally, the engagement of the nut threads 226 with the roller threads 206 enable a movement or translation of the output rod or inverted nut 110 relative to the inner shaft 308 and the actuator housing 316, which moves the flight control surface 14 relative to the frame 12. The sensor 306 observes the rotation of the inner shaft 308, and communicates the sensor signals to the controller of the vehicle 10, for example, to determine the position of the inverted nut 110.

Figure 9:
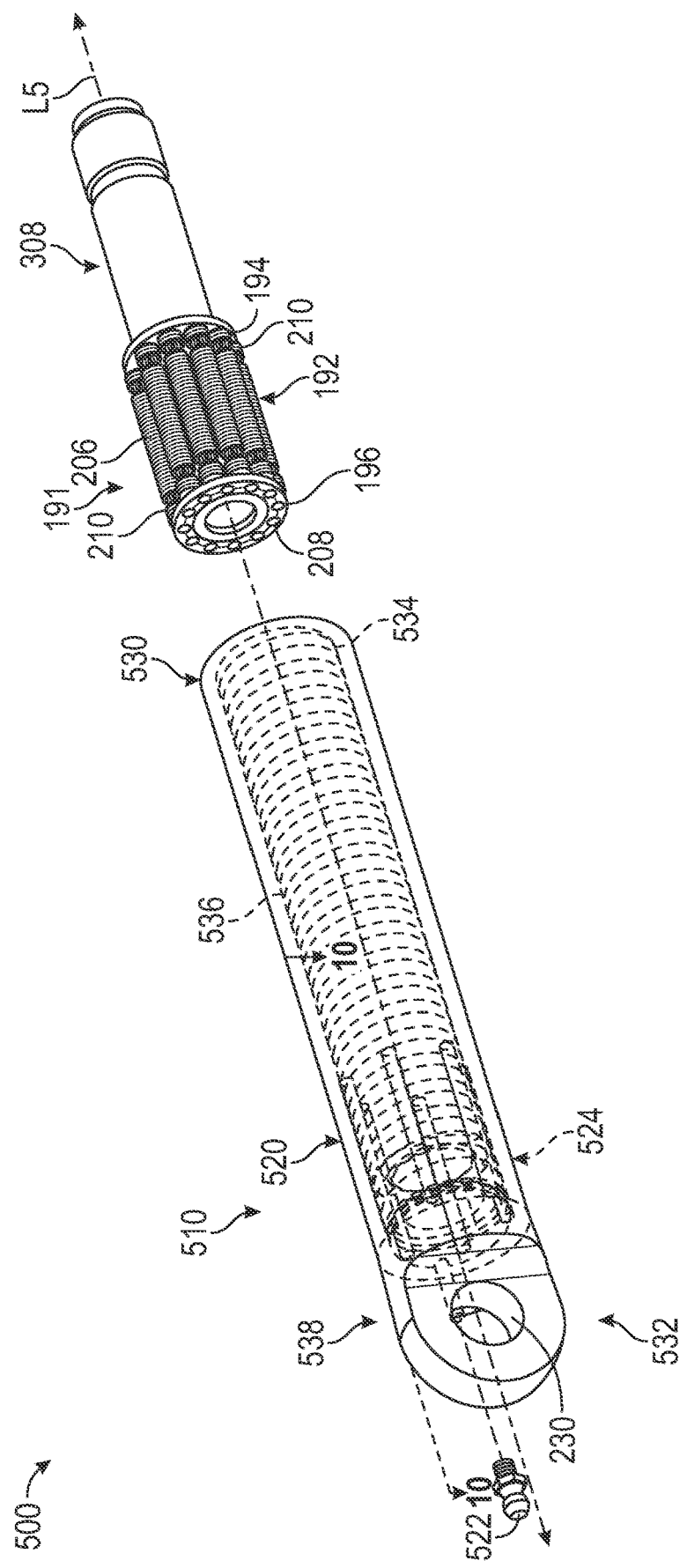
FIG. 9 is a schematic exploded view of another exemplary actuator system for the flight control surface associated with the aerial vehicle in accordance with the various teachings of the present disclosure, which includes an exemplary inverted nut lubrication system.
Figure 9A:
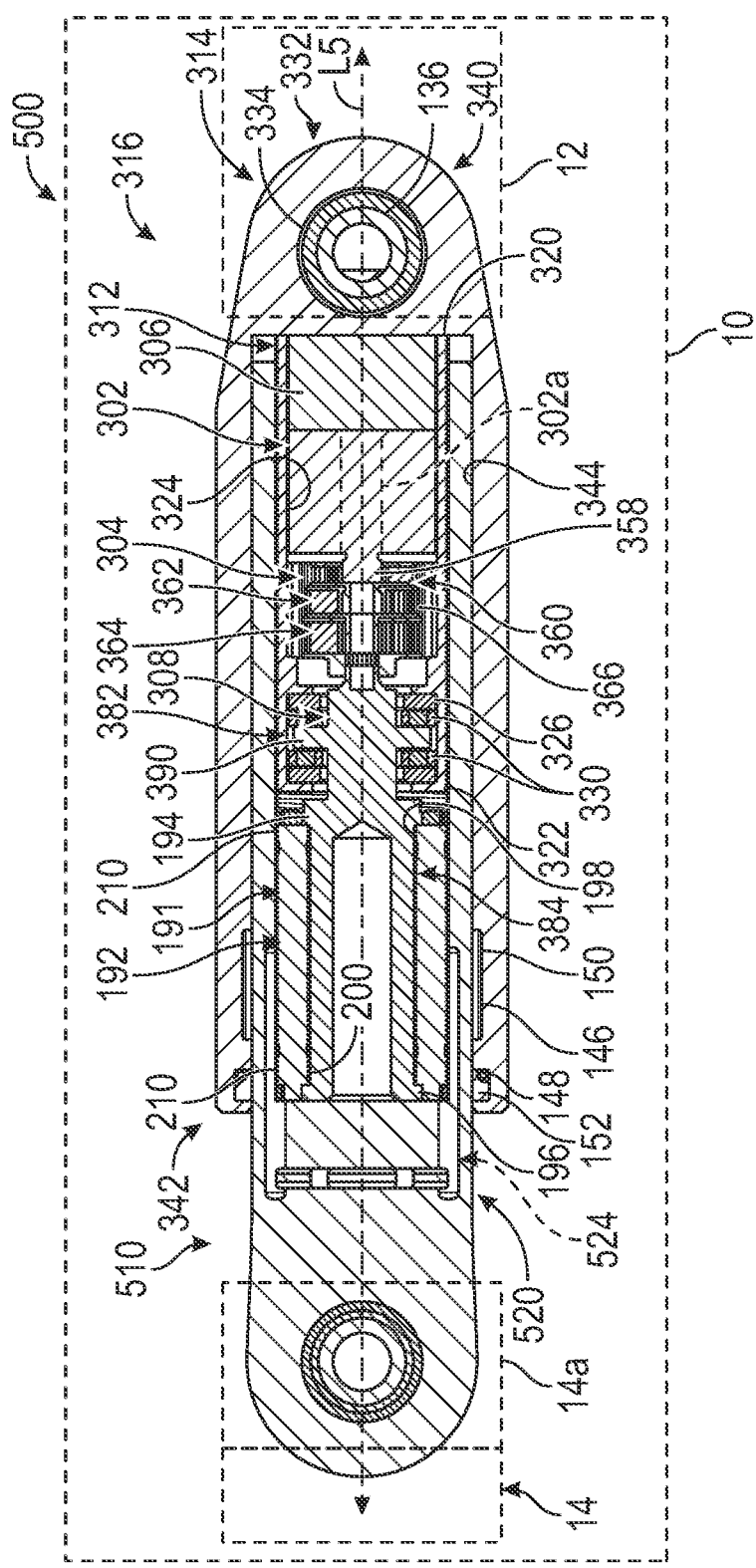
FIG. 9A is a cross-sectional view of the actuator system of FIG. 9, in which the actuator system is in the first, retracted position.
Figure 9B:
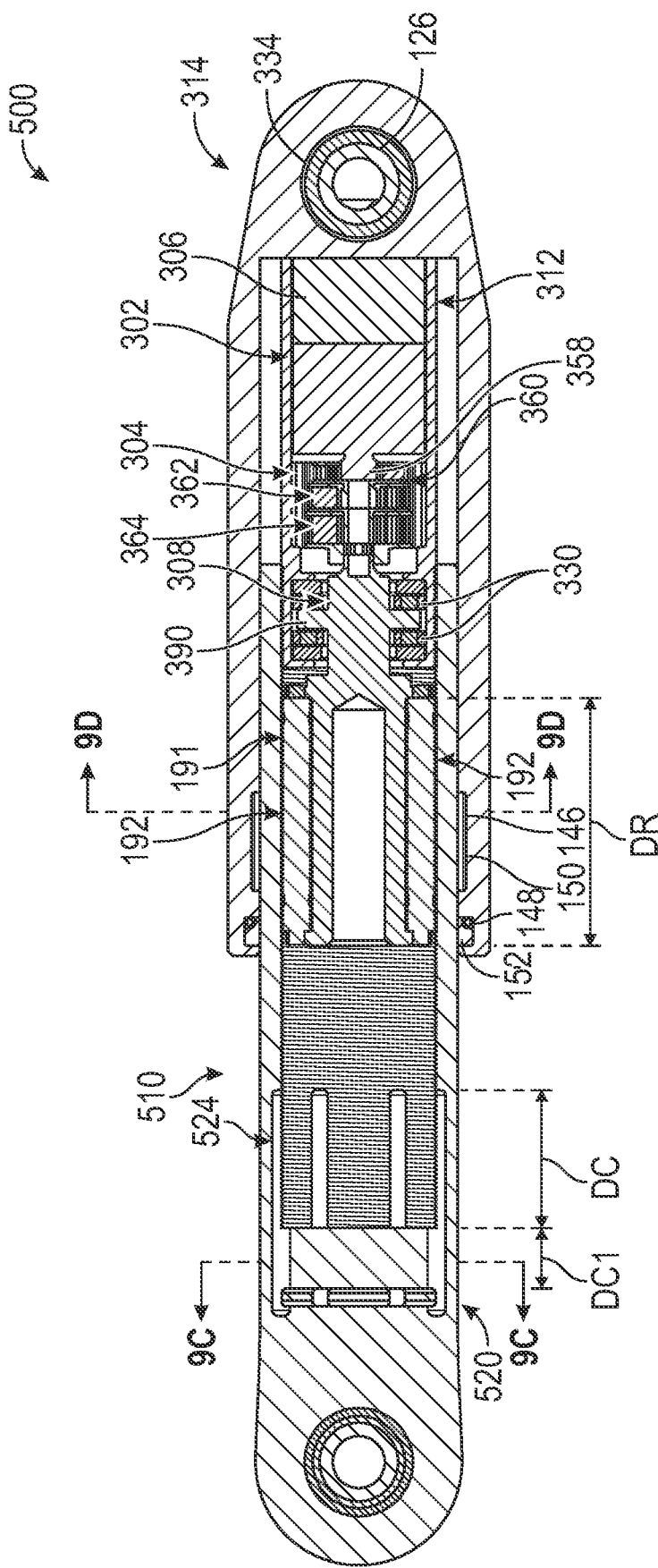
FIG. 9B is a cross-sectional view of the actuator system of FIG. 9, in which the actuator system is in the second, extended position.

In addition, it should be noted that while the actuator system 100 is shown in FIGS. 1-5 and the actuator system 300 is shown in FIGS. 6-8 as comprising the inverted roller screw 191 on the inner shaft 108, 308 that cooperates with the inverted nut 110, an actuator system may be configured differently to move the flight control surface 14 relative to the frame 12. For example, with reference to FIGS. 9-9B, an actuator system 500 is shown for use with the vehicle 10 (FIG. 9A). As the actuator system 500 includes components that are the same or similar to components of the actuator system 300 discussed with regard to FIGS. 6-8, the same reference numerals will be used to denote the same or similar components. In one example, the actuator system 500 includes the motor 302 (FIGS. 9A and 9B), the gearbox 304 (FIGS. 9A and 9B), the sensor 306 (FIGS. 9A and 9B), the first or inner shaft 308 and an inverted nut lubrication system 510. The motor 302 and the gearbox 304 are disposed or arranged along a longitudinal axis L5 of the actuator system 500. The gearbox 304, at least a portion of the motor 302 and at least a portion of the sensor 306 are disposed within or enclosed in the first actuator housing 312, and the inner shaft 308 is disposed within or enclosed in the second actuator housing 314. The first actuator housing 312 and the second actuator housing 314 cooperate to form the actuator housing 316. A portion of the inverted nut lubrication system 510 is movable relative to the actuator housing 316.

With reference to FIG. 9A, the first actuator housing 312 includes the first housing end 320 opposite the second housing end 322, and the housing bore 324. The first housing end 320 is coupled to the second actuator housing 314. The second housing end 322 is adjacent or proximate the inverted nut lubrication system 510 when the actuator system 500 is in the first, retracted position. The housing bore 324 receives the sensor 306, the motor 302, the gearbox 304, the pair of bearings 330 and the portion of the inner shaft 308. The second actuator housing 314 includes the third housing end 340 opposite the fourth housing end 342, and the housing counterbore 344. The second actuator housing 314 includes the first coupling flange 332 that extends axially from the third housing end 340. The first coupling flange 332 defines the first bore 334 and the first coupling bearing 136 is received within and coupled to the first bore 334. The first coupling bearing 136 receives the mechanical fastener, such as the pin, bolt, etc., to couple the second actuator housing 314, and thus, the actuator system 500 to the frame 12 of the vehicle 10. As discussed, in one example, the first coupling bearing 136 receives the pin, which couples the second actuator housing 314 to the fork mount coupled to the frame 12. It should be noted that the second actuator housing 314 may be coupled to the frame 12 via any suitable technique, including, but not limited to the fork mount illustrated herein, a trunnion, a pin-to-pin mount, a reaction/kick link mount, a flange mount, etc. The housing counterbore 344 is defined to receive the first actuator housing 312 and a portion of the inverted nut lubrication system 510. The housing counterbore 344 includes the first inner slot 146 and the second inner slot 148. The first inner slot 146 is sized to receive the bushing 150, and the second inner slot 148 receives the wiper or scraper 152.

The motor 302 includes the output shaft 358, which is coupled to the gearbox 304. The motor 302 is operable to drive or rotate the output shaft 358, which in turn, drives the gearbox 304. In one example, the gearbox 304 comprises the single or the multistage planetary gearbox. In this example, the gearbox 304 includes the first planetary stage 360, the second planetary stage 362, the third planetary stage 364 and the common ring gear 366. The third planetary stage 364 is coupled to the inner shaft 308 so as to drive the inner shaft 308.

The sensor 306 observes a rotation of a portion of the motor 302, and generates sensor signals based the observation. In one example, sensor 306 is a rotary variable differential transformer (RVDT) sensor, which observes the rotor 302a of the motor 302. Generally, as the position of the rotor 302a of the motor 302 is directly proportional to the position of the inverted nut lubrication system 510, the position of the inverted nut lubrication system 510 may be determined based on the sensor signals from the sensor 306.

The inner shaft 308 includes the first portion 382 at the first end 384, and the second portion 386 at the second end 388. The first end 384 of the inner shaft 308 is received within and coupled to the output 376 of the third planetary stage 364 such that the inner shaft 308 is driven by the gearbox 304. The first portion 382 of the inner shaft 308 is coupled to the bearings 330. In one example, the first portion 382 includes the flange 390, which assists in positioning the bearings 330 within the radial flange 326 of the first actuator housing 312. The second portion 386 extends from the first portion 382 to the second end 388 of the inner shaft 308. The second portion 386 includes the inverted roller screw 191. As discussed, the inverted roller screw 191 includes the plurality of rollers 192, the first roller guide 194, the second roller guide 196, the first toothed section 198 and the second toothed section 200. Generally, the rollers 192 are coupled to the inner shaft 308 to rotate with the inner shaft 308. The rotation of the inner shaft 308 rotates the rollers 192, which are coupled to or engaged with the inverted nut lubrication system 510. The rotation of the rollers 192 causes a translation of the inverted nut lubrication system 510 relative to the inner shaft 308. The engagement of the roller gear teeth 210 with the first toothed section 198 and the second toothed section 200 enable the rollers 192 to rotate relative to the inner shaft 308 to drive or move the inverted nut lubrication system 510 during the rotation of the inner shaft 308.

With reference back to FIG. 9, the inverted nut lubrication system 510 includes an inverted nut 520, a lubrication fitting 522 and at least one lubrication channel 524. The inverted nut 520 cooperates with the inverted roller screw 191 to enable a movement or translation of the inverted nut 520 relative to the inner shaft 308 and the actuator housing 316. The inverted nut 520 is composed of a metal or metal alloy, and may be cast, forged, additively manufactured, etc. In this example, the inverted nut 520 defines an output rod and includes a first nut end 530 opposite a second nut end 532. The first nut end 530 defines an inner bore or counterbore 534, which extends from the first nut end 530 to proximate the second nut end 532. The counterbore 534 includes a plurality of nut threads 536, which engage or mesh with the roller threads 206. The nut threads 536 are defined about the perimeter or circumference of the counterbore 534 and extend axially for a length of the counterbore 534. Thus, in this example, a length of travel of the inverted nut 520 is about equal to a length of the counterbore 534. In other embodiments, the nut threads 536 may extend for a length that is different and less than a length of the counterbore 534 to enable a predetermined amount of travel of the inverted nut 520.

The second nut end 532 includes a second coupling flange 538, a lubrication input bore 540 and the at least one lubrication channel 524. In this example, with reference to FIG. 10, the second coupling flange 538 extends axially outward from the second nut end 532 and defines the second bore 230. The second bore 230 is defined along an axis substantially perpendicular to the longitudinal axis L5 (FIG. 9). The second coupling bearing 232 is received within and coupled to the second bore 230. The second coupling bearing 232 receives a mechanical fastener, such as a pin, bolt, to couple the inverted nut 520 or output rod, and thus, the actuator system 500 to the flight control surface 14 of the vehicle 10. It should be noted that the inverted nut 520 may be coupled to the flight control surface 14 via any suitable technique, including, but not limited to the fork mount illustrated herein, a trunnion, a pin-to-pin mount, a reaction/kick link mount, a flange mount, etc. In this example, the fork mount includes two guides 14a. The guides 14a provide external anti-rotation to the actuator system 500, and ensure that the inverted nut 520 translates substantially linearly without rotation. It should be noted that in other embodiments, the actuator system 500 may include an internal anti-rotation structure, such as a rail and a groove, etc. Further, the use of the guides 14a is merely an example, as the vehicle 10 may include another structure that ensures the translation of the inverted nut 520 with substantially no rotation.

Figure 10:
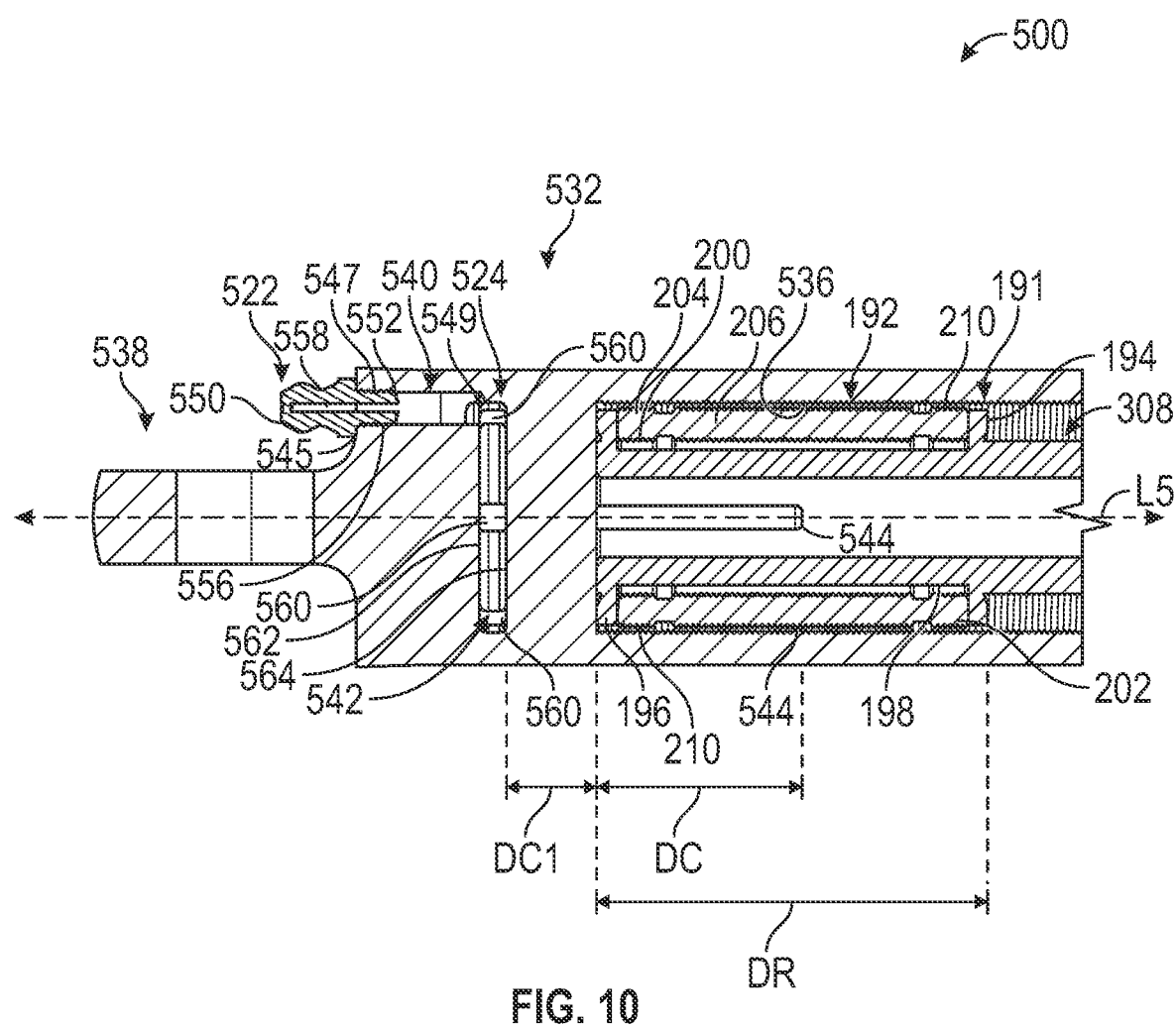
FIG. 10 is a cross-sectional view of the actuator system of FIG. 9, taken along line 10-10 of FIG. 9.

In this example, the second nut end 532 also defines a lubrication input bore 540. With reference to FIG. 10, the lubrication input bore 540 is defined axially through the second nut end 532 proximate the second coupling flange 538. In this example, the lubrication input bore 540 is offset from the longitudinal axis L5. The lubrication input bore 540 is configured to receive the lubrication fitting 522 at a first bore end 545, and may include one or more threads 547 or other mating features to couple the lubrication fitting 522 to the lubrication input bore 540. The lubrication input bore 540 is in fluid communication with the at least one lubrication channel 524 at a second bore end 549. The second bore end 549 is opposite the first bore end 545.

In one example, the at least one lubrication channel 524 includes a first distribution channel 542 and a plurality of second distribution channels 544. The first distribution channel 542 is in fluid communication with the lubrication input bore 540, and is in fluid communication with each of the second distribution channels 544 to distribute a lubricant fluid or lubricant, such as oil, grease, etc., to the second distribution channels 544. In one example, the first distribution channel 542 is a circumferential groove, which is defined about an inner perimeter or circumference of the inverted nut 520 proximate the second nut end 532 so as to be defined between the second coupling flange 538 and the counterbore 534. A first channel end 560 of each of the second distribution channels 544 is in fluid communication with the first distribution channel 542. In this example, the first channel end 560 is defined to extend through the first distribution channel 542 from a first side 562 to an opposite second side 564 of the first distribution channel 542 so as to intersect the first distribution channel 542, however, in other examples, the first channel end 560 may be defined along the second side 564.

Figure 9C:
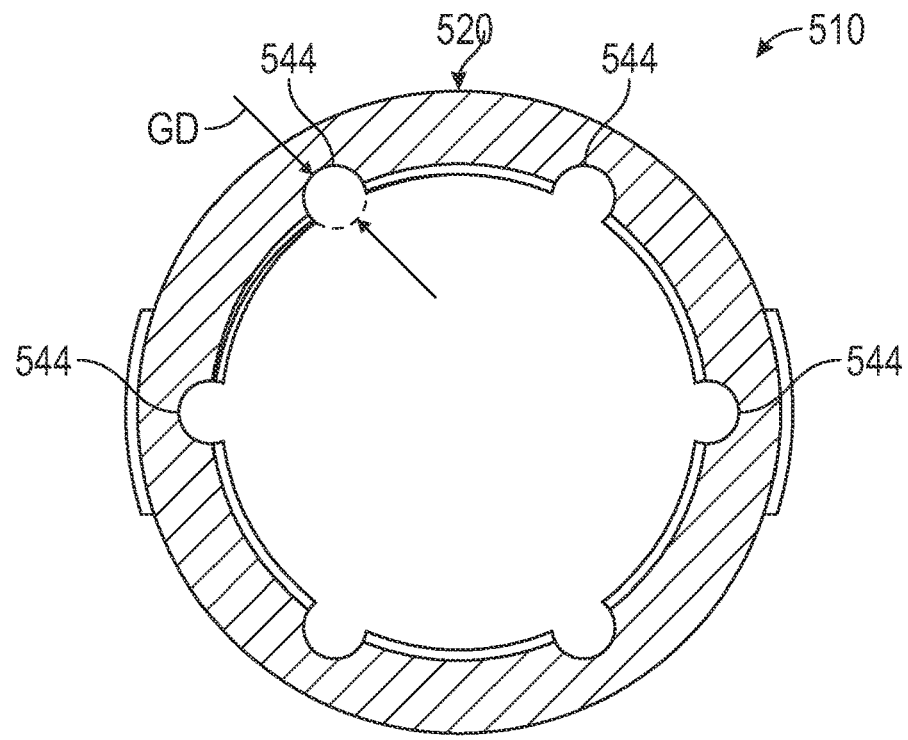
FIG. 9C is a cross-sectional view of the actuator system of FIG. 9, taken at line 9C-9C of FIG. 9B.
Figure 9D:
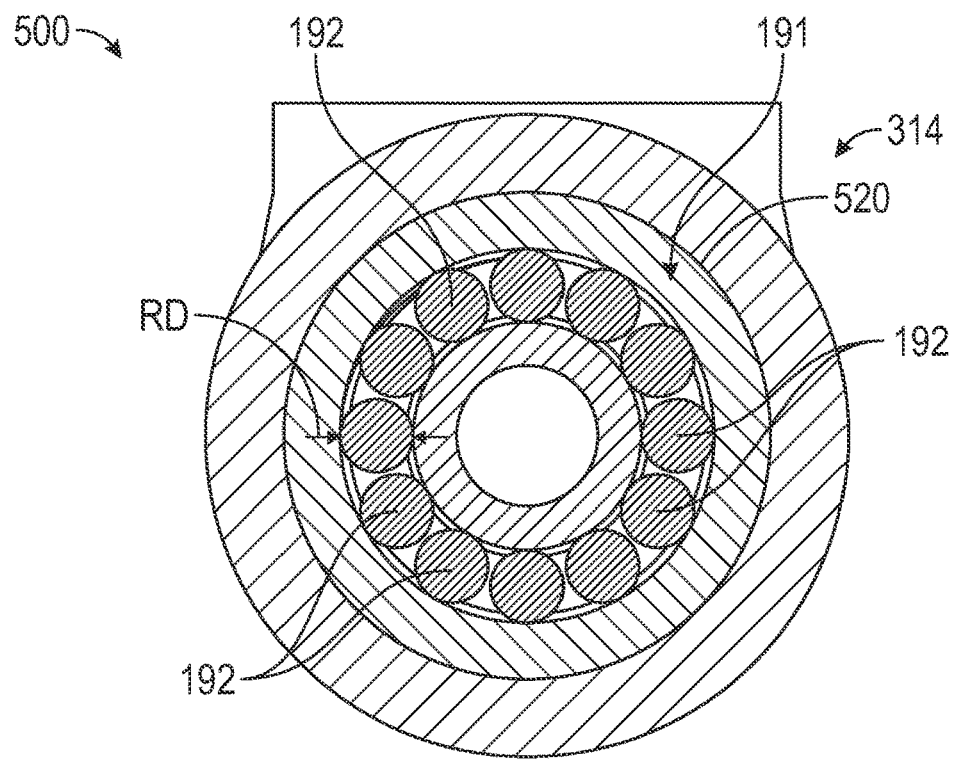
FIG. 9D is a cross-sectional view of the actuator system of FIG. 9, taken at line 9D-9D of FIG. 9B.

Each of the second distribution channels 544 extends from the first channel end 560 to an opposite second channel end 568. In one example, the second distribution channels 544 are defined through a portion of the nut threads 536. The second distribution channels 544 are spaced apart about the inner perimeter or circumference of the counterbore 546, and generally extend along an axis substantially parallel to the longitudinal axis L5. In one example, there is one second distribution channel 544 associated with each pair of the rollers 192 to ensure each of the rollers 192 is sufficiently lubricated (FIGS. 9C and 9D). It should be noted that in other examples, the rollers 192 may have a one to one correspondence with each of the second distribution channels 544. Generally, the inverted nut lubrication system 510 includes about five to about eight of the second distribution channels 544, and the pitch diameter of the pattern of the second distribution channels 544 is about 1.0 times to about 1.3 times a minor thread diameter of one of the rollers 192. Each of the second distribution channels 544 is defined in the counterbore 546 to extend axially over a channel distance DC. Generally, the channel distance DC is defined so that at least a portion of the rollers 192 is in fluid communication with the second distribution channels 544 in the first, retracted position (FIG. 10). In one example, the channel distance DC is about 0.8 times to about 1.1 times a distance DR. The distance DR is a length of each of the rollers 192, and is defined between the first roller guide 194 and the second roller guide 196.

By extending for the channel distance DC, the second distribution channels 544 ensure that the rollers 192 of the inverted roller screw 191 are lubricated when the inverted nut 520 is in the first, retracted position (as shown in FIG. 10). This improves a life of the rollers 192, and of the inverted nut 520, by ensuring proper lubrication between the rotating components. In this example, the channel distance DC is different than the distance DR. By providing the channel distance DC different than the distance DR, the rotation of the rollers 192 may be used to draw the lubricant from proximate the second roller end 204 to the first roller end 202. The second distribution channels 544 are each defined to have a groove depth GD (FIG. 9C), which is about 0.5 times to about 0.6 times a roller diameter RD (FIG. 9D).

The second distribution channels 544 are each defined to extend a distance DC1 from the first distribution channel 542 to fluidly couple each of the second distribution channels 544 to the first distribution channel 542. In one example, the distance DC1 is about 1.2 times to about 1.5 times the groove depth GD. Thus, each of the second distribution channels 544 has an overall channel length that is a sum of the distance DC1 and the distance DC.

The lubrication fitting 522 is configured to control the flow of the lubricant into the lubrication input bore 540 and is a source of the lubricant for the inverted nut 520. In one example, the lubrication fitting 522 is a grease fitting. The lubrication fitting 522 includes a first fitting end 550 opposite a second fitting end 552, and a bore 554 that extends from the first fitting end 550 to the second fitting end 552. The first fitting end 550 is configured to be coupled to a source of the lubricant. The second fitting end 552 includes a plurality of fitting threads 556, which engage or mate with the threads 547 of the lubrication input bore 540. The bore 554 includes a seal 558, which may be pierced by a grease gun, for example, to inject the lubricant into the lubrication input bore 540. It should be noted, however, that other types of lubricant fittings may be employed.

In one example, in order to assemble the actuator system 500, with the gearbox 304 coupled to the output shaft 358 of the motor 302, the sensor 306, the motor 302 and the gearbox 304 are coupled to the first actuator housing 312. The rollers 192 are coupled to the first roller guide 194 and the second roller guide 196 so that the respective roller gear teeth 210 engage with each of the first toothed section 198 and the second toothed section 200. The inverted nut 520 is coupled about the inverted roller screw 191 such that the nut threads 226 engage with the roller threads 206. The bearings 330 are each coupled to the first end 384 of the inner shaft 308, and the inner shaft 308 is coupled to the first actuator housing 312. With the scraper 152 and the bushing 150 coupled to the second actuator housing 314, the second actuator housing 314 is coupled about the first actuator housing 312 and a portion of the inverted nut lubrication system 510. With the actuator system 500 assembled, the first coupling bearing 136 is coupled to the frame 12 of the vehicle 10, and the second coupling bearing 232 is coupled to the flight control surface 14 of the vehicle 10.

In order to lubricate the inverted roller screw 191, with the inverted nut 520 in the first, retracted position (FIG. 10), in example, a grease gun containing the lubricant is fluidly coupled to the lubrication input bore 540 via the lubrication fitting 522. The lubricant flows through the lubrication input bore 540 to the first distribution channel 542. From the first distribution channel 542, the lubricant flows into each of the second distribution channels 544. Generally, with the inverted nut 520 in the first, retracted position (FIG. 10), once the motor 102 is actuated, via one or more control signals received from the controller associated with the vehicle 10 for example, the output shaft 358 rotates the gearbox 304. The rotation of the gearbox 304 rotates or drives the inner shaft 308. The rotation of the inner shaft 308 moves or rotates the rollers 192 of the inverted roller screw 191, which causes lubricant in the second distribution channels 544 to be drawn onto the roller threads 206, and spread along the roller threads 206 with the rotation of the rollers 192. The rotation of the rollers 192 causes the inverted nut 520 to rotate, and also transfers the lubricant from the roller threads 206 to the nut threads 536 to lubricate the inverted nut 520. The engagement of the nut threads 536 with the roller threads 206 enables a movement or translation of the output rod or inverted nut 520 relative to the inner shaft 308 and the actuator housing 316, which moves the flight control surface 14 relative to the frame 12.

Figure 11:
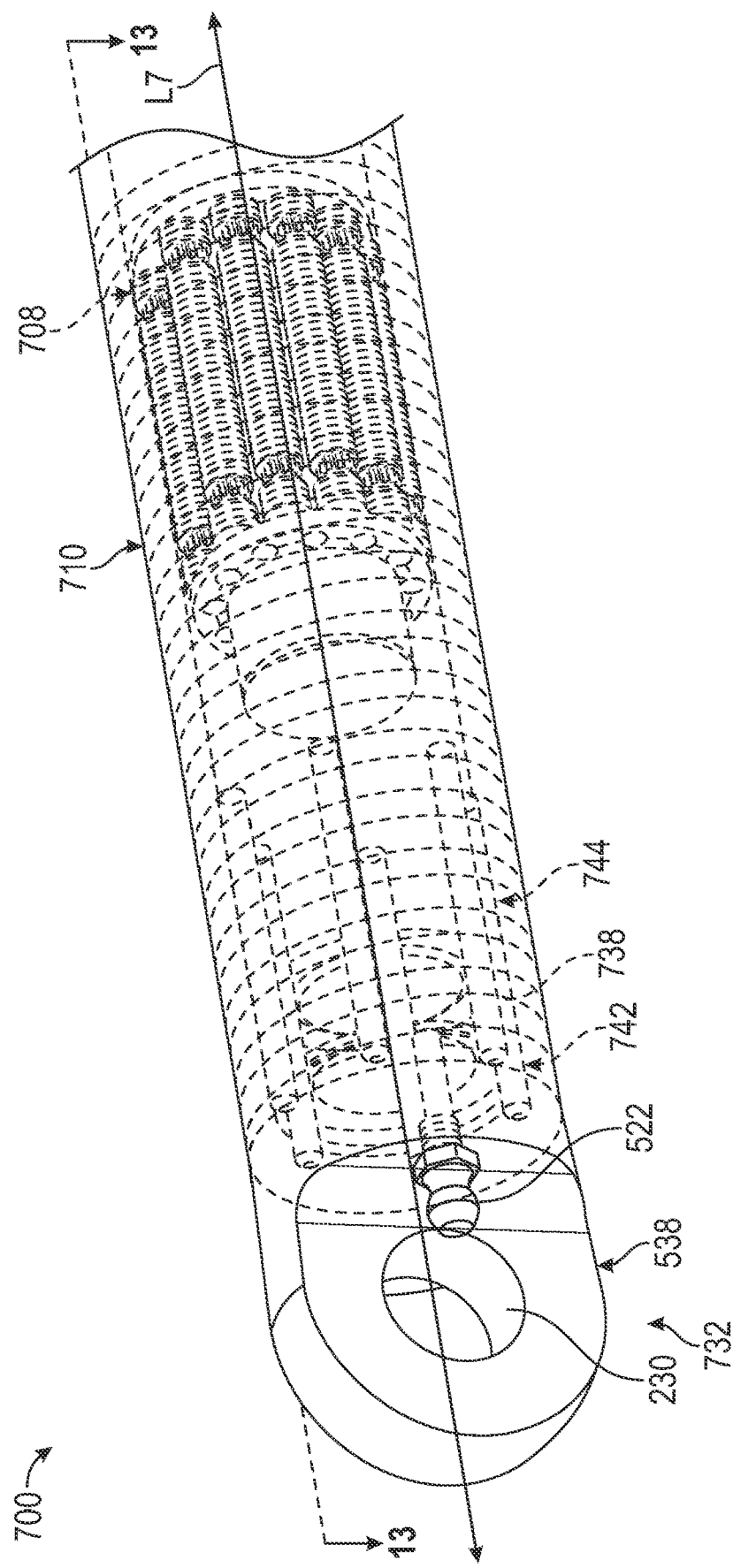
FIG. 11 is a schematic perspective view of another exemplary actuator system for the flight control surface associated with the aerial vehicle in a second, extended position in accordance with the various teachings of the present disclosure, which includes another exemplary inverted nut lubrication system.

In addition, it should be noted that while the actuator system 100 is shown in FIGS. 1-5 and the actuator system 300 is shown in FIGS. 6-8 as comprising the inverted roller screw 191 on the inner shaft 108, 308 that cooperates with the inverted nut 110, an actuator system may be configured differently to move the flight control surface 14 relative to the frame 12. For example, with reference to FIGS. 11-11B, an actuator system 700 is shown for use with the vehicle 10. As the actuator system 700 includes components that are the same or similar to components of the actuator system 300 discussed with regard to FIGS. 6-8 and the actuator system 500 discussed with regard to FIGS. 9 and 10, the same reference numerals will be used to denote the same or similar components. In one example, the actuator system 700 includes the motor 302 (FIGS. 11A and 11B), the gearbox 304 (FIGS. 11A and 11B), the sensor 306 (FIGS. 11A and 11B), a first or inner shaft 708 and an inverted nut lubrication system 710. The motor 302 and the gearbox 304 are disposed or arranged along a longitudinal axis L7 of the actuator system 700. The gearbox 304, at least a portion of the motor 302 and at least a portion of the sensor 306 are disposed within or enclosed in the first actuator housing 312, and the inner shaft 708 is disposed within or enclosed in the second actuator housing 314. The first actuator housing 312 and the second actuator housing 314 cooperate to form the actuator housing 316. A portion of the inverted nut lubrication system 710 is movable relative to the actuator housing 316.

Figure 11A:
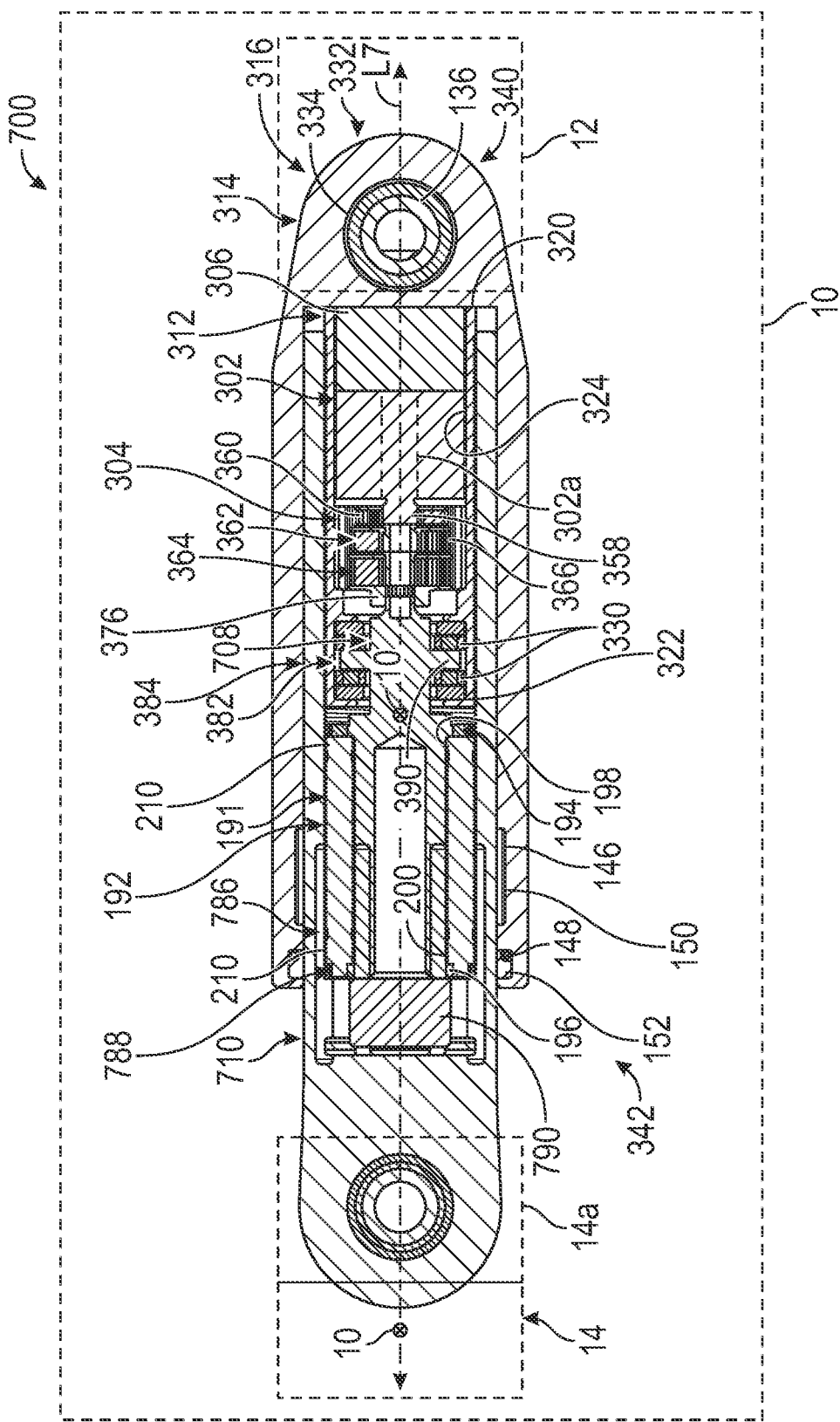
FIG. 11A is a cross-sectional view of the actuator system of FIG. 11, in which the actuator system is in the first, retracted position.
Figure 11B:
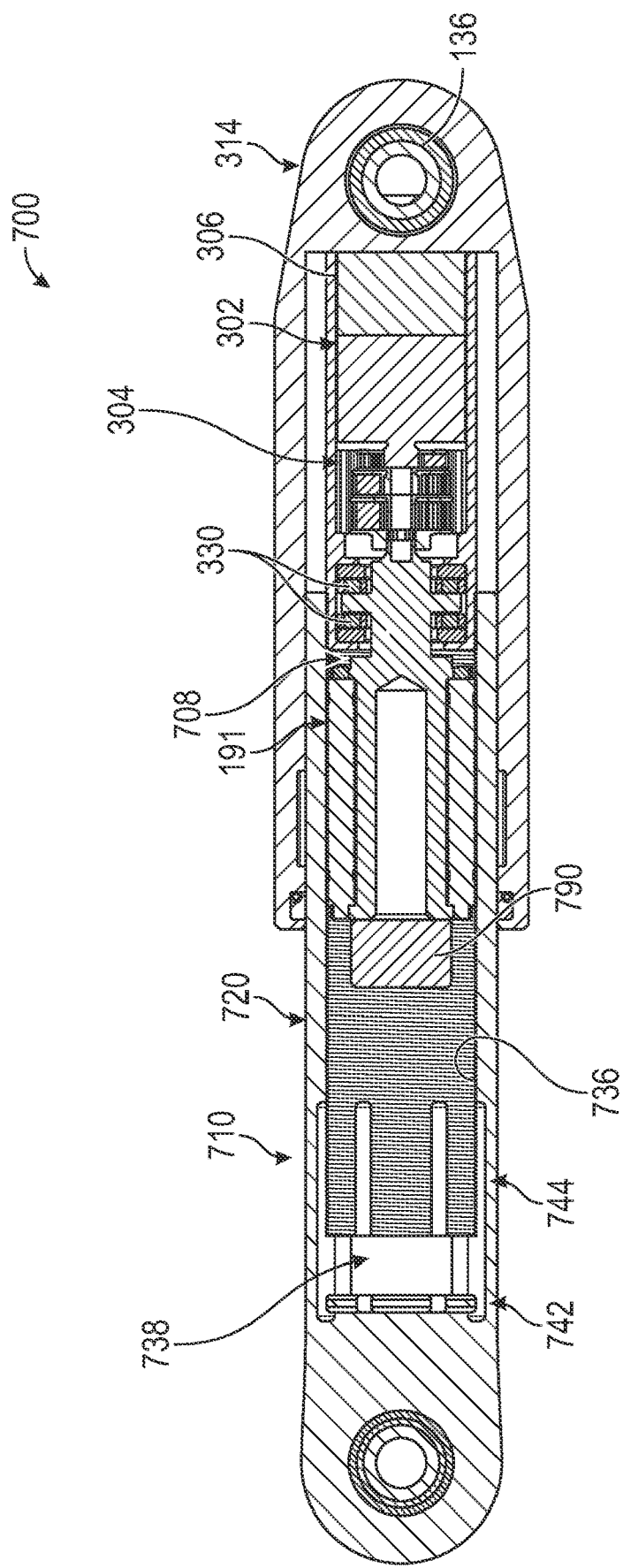
FIG. 11B is a cross-sectional view of the actuator system of FIG. 11, in which the actuator system is in the second, extended position.

The first actuator housing 312 includes the first housing end 320 opposite the second housing end 322, and the housing bore 324. The first housing end 320 is coupled to the second actuator housing 314. The second housing end 322 is adjacent or proximate the inverted nut lubrication system 710 when the actuator system 700 is in the first, retracted position. The housing bore 324 receives the sensor 306, the motor 302, the gearbox 304, the pair of bearings 330 and the portion of the inner shaft 708. The second actuator housing 314 includes the third housing end 340 opposite the fourth housing end 342, and the housing counterbore 344. The second actuator housing 314 includes the first coupling flange 332 that extends axially from the third housing end 340. The first coupling flange 132 defines the first bore 334 and the first coupling bearing 136 is received within and coupled to the first bore 334. The first coupling bearing 136 receives the mechanical fastener to couple the second actuator housing 314, and thus, the actuator system 700 to the frame 12 of the vehicle 10 (FIG. 11A). The housing counterbore 344 is defined to receive the first actuator housing 312 and a portion of the inverted nut lubrication system 710. The housing counterbore 344 includes the first inner slot 146 and the second inner slot 148. The first inner slot 146 is sized to receive the bushing 150, and the second inner slot 148 receives the wiper or scraper 152.

The motor 302 includes the output shaft 358, which is coupled to the gearbox 304. The motor 302 is operable to drive or rotate the output shaft 358, which in turn, drives the gearbox 304. In one example, the gearbox 304 comprises the single or the multistage planetary gearbox. In this example, the gearbox 304 includes the first planetary stage 360, the second planetary stage 362, the third planetary stage 364 and the common ring gear 366. The third planetary stage 364 is coupled to the inner shaft 708 so as to drive the inner shaft 708.

The sensor 306 observes a rotation of a portion of the motor 302, and generates sensor signals based the observation. Generally, as the position of the rotor 302a of the motor 302 is directly proportional to the position of the inverted nut lubrication system 710, the position of the inverted nut lubrication system 710 may be determined based on the sensor signals from the sensor 306.

The inner shaft 708 includes the first portion 382 at the first end 384, and a second portion 786 at a second end 788. The first end 384 is opposite second end 788. The inner shaft 708 is composed of metal or metal alloy, and may be cast, forged, additively manufactured, etc. The first end 384 of the inner shaft 708 is received within and coupled to the output 376 of the third planetary stage 364 such that the inner shaft 708 is driven by the gearbox 304. The first portion 382 of the inner shaft 708 is coupled to the bearings 330. In one example, the first portion 382 includes the flange 390 proximate, but spaced apart from the first end 384, which assists in positioning the bearings 330 within the radial flange 326 of the first actuator housing 312.

In this example, the second portion 786 of the inner shaft 708 is substantially cylindrical and hollow in order to reduce a weight of the actuator system 700. The second portion 786 extends from the first portion 382 to the second end 788 of the inner shaft 708. The second portion 786 includes the inverted roller screw 191 and a plunger 790. As discussed, the inverted roller screw 191 includes the plurality of rollers 192, the first roller guide 194, the second roller guide 196, the first toothed section 198 and the second toothed section 200. The rollers 192 extend axially along the second portion 786 to the second end 788. The first roller guide 194 is retained about the second portion 786 by a retaining ring, for example. The first roller guide 194 couples the rollers 192 to the inner shaft 708 to guide the respective roller 192 as the roller 192 rotates relative to the inner shaft 708. The second roller guide 196 is retained about the second portion 786 proximate the second end 788 by a retaining ring, for example. The second roller guide 196 also couples the rollers 192 to the inner shaft 708 to guide the respective roller 192 as the roller 192 rotates relative to the inner shaft 708. The first toothed section 198 is defined about the outer perimeter or circumference of the inner shaft 708 along the second portion 786 proximate or adjacent to the first roller guide 194. The second toothed section 200 is defined about the outer perimeter or circumference of the inner shaft 708 along the second portion 786 proximate or adjacent to the second roller guide 196.

Thus, generally, the rollers 192 are coupled to the inner shaft 708 to rotate with the inner shaft 708. The rotation of the inner shaft 708 rotates the rollers 192, which are coupled to or engaged with the inverted nut lubrication system 710. The rotation of the rollers 192 causes a translation of the inverted nut lubrication system 710 relative to the inner shaft 708. The engagement of the roller gear teeth 210 with the first toothed section 198 and the second toothed section 200 enable the rollers 192 to rotate relative to the inner shaft 708 to drive or move the inverted nut lubrication system 710 during the rotation of the inner shaft 708.

Figure 12:
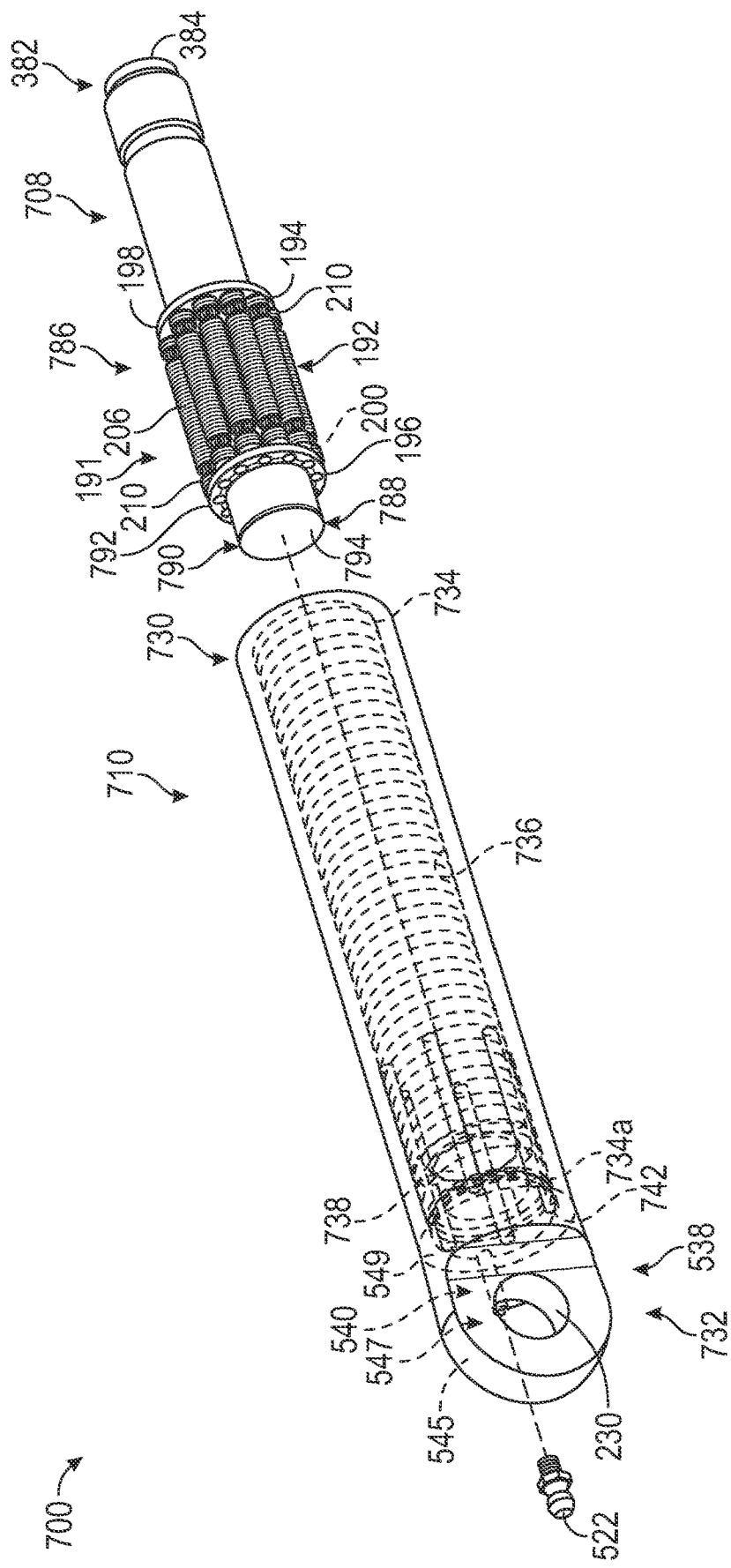
FIG. 12 is an exploded view of the actuator system of FIG. 11.
Figure 14:
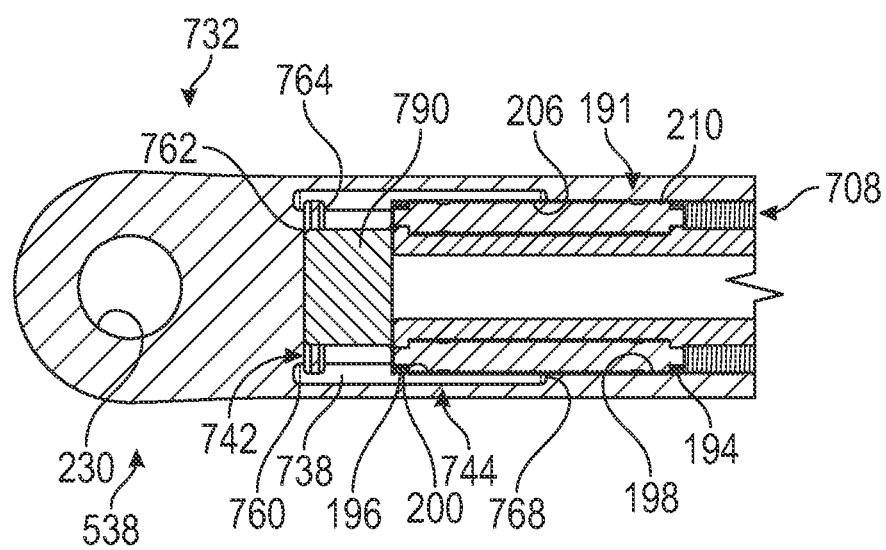
FIG. 14 is a cross-sectional view of the actuator system of FIG. 11, taken from the perspective of line 13-13 of FIG. 11, in which the actuator system is in a first, retracted position.

With reference to FIG. 12, the plunger 790 is coupled to the second end 788 of the inner shaft 708. In one example, the plunger 790 is cylindrical, and has a diameter, which is different and less than a diameter of the second roller guide 196. The plunger 790 extends axially from the second roller guide 196 to define a terminal end of the inner shaft 708. The plunger 790 is composed of a polymer-based material, including, but not limited to a rubber, etc., however, the plunger 790 may be composed of a metal or metal alloy, if desired. The plunger 790 includes a first plunger end 792 opposite a second plunger end 794. The first plunger end 792 is coupled to the second roller guide 196. The second plunger end 794 defines the second end 788 of the inner shaft 708 and contacts a portion of the inverted nut lubrication system 710 when the actuator system 700 is in the first, retracted position (FIGS. 11A and 14). As will be discussed, the contact between the plunger 790 and the portion of the inverted nut lubrication system 710 in the first, retracted position supplies lubricant to the rollers 192 of the inverted roller screw 191.

The inverted nut lubrication system 710 includes an inverted nut 720, the lubrication fitting 522 and at least one lubrication channel 724. The inverted nut 720 cooperates with the inverted roller screw 191 to enable a movement or translation of the inverted nut 720 relative to the inner shaft 708 and the actuator housing 316. The inverted nut 720 is composed of a metal or metal alloy, and may be cast, forged, additively manufactured, etc. In this example, the inverted nut 720 defines an output rod and includes a first nut end 730 opposite a second nut end 732. The first nut end 730 defines an inner bore or counterbore 734, which extends from the first nut end 730 to proximate the second nut end 732. The counterbore 734 includes a plurality of nut threads 736, which engage or mesh with the roller threads 206. The nut threads 736 are defined about the perimeter or circumference of the counterbore 734 and extend axially for a length of the counterbore 734. Thus, in this example, a length of travel of the inverted nut 720 is about equal to a length of the counterbore 734. In other embodiments, the nut threads 736 may extend for a length that is different and less than a length of the counterbore 734 to enable a predetermined amount of travel of the inverted nut 720. The counterbore 734 also defines a lubricant reservoir 738 proximate the second nut end 732 and at a terminal end 734a of the counterbore 734. The terminal end 734a of the counterbore 734 is opposite the first nut end 730. Generally, the lubricant reservoir 738 has a diameter sized to receive the plunger 790, and the diameter may be different and less than a remainder of the counterbore 734 to guide the plunger 790 into the lubricant reservoir 738. As will be discussed, the lubricant reservoir 738 is in fluid communication with the at least one lubrication channel 724 to receive a lubricant fluid or lubricant, such as grease, etc. Generally, the lubricant reservoir 738 is an internal reservoir for the lubricant received from the at least one lubrication channel 724. The lubricant reservoir 738 may also act as a stop to limit a further advancement of the inverted roller screw 191.

The second nut end 732 includes the second coupling flange 538, the lubrication input bore 540 and the at least one lubrication channel 724. The second coupling flange 538 extends axially outward from the second nut end 732 and defines the second bore 230. The second bore 230 is defined along an axis substantially perpendicular to the longitudinal axis L7 (FIG. 11). The second coupling bearing 232 is received within and coupled to the second bore 230. The second coupling bearing 232 receives a mechanical fastener, such as a pin, a bolt, to couple the inverted nut 720 or output rod, and thus, the actuator system 700 to the flight control surface 14 of the vehicle 10. It should be noted that the inverted nut 720 may be coupled to the flight control surface 14 via any suitable technique, including, but not limited to the fork mount illustrated herein, a trunnion, a pin-to-pin mount, a reaction/kick link mount, a flange mount, etc. In this example, the fork mount includes two guides 14a. The guides 14a provide external anti-rotation to the actuator system 700, and ensure that the inverted nut 720 translates substantially linearly without rotation. It should be noted that in other embodiments, the actuator system 700 may include an internal anti-rotation structure, such as a rail and a groove, etc. Further, the use of the guides 14a is merely an example, as the vehicle 10 may include another structure that ensures the translation of the inverted nut 720 with substantially no rotation.

In this example, the second nut end 732 also defines the lubrication input bore 540. The lubrication input bore 540 is defined axially through the second nut end 732 proximate the second coupling flange 538. In this example, the lubrication input bore 540 is offset from the longitudinal axis L7 (FIG. 11). The lubrication input bore 540 is configured to receive the lubrication fitting 522 at the first bore end 545, and may include the threads 547 to couple the lubrication fitting 522 to the lubrication input bore 540. The lubrication input bore 540 is in fluid communication with the at least one lubrication channel 724 at the second bore end 549.

Figure 13:
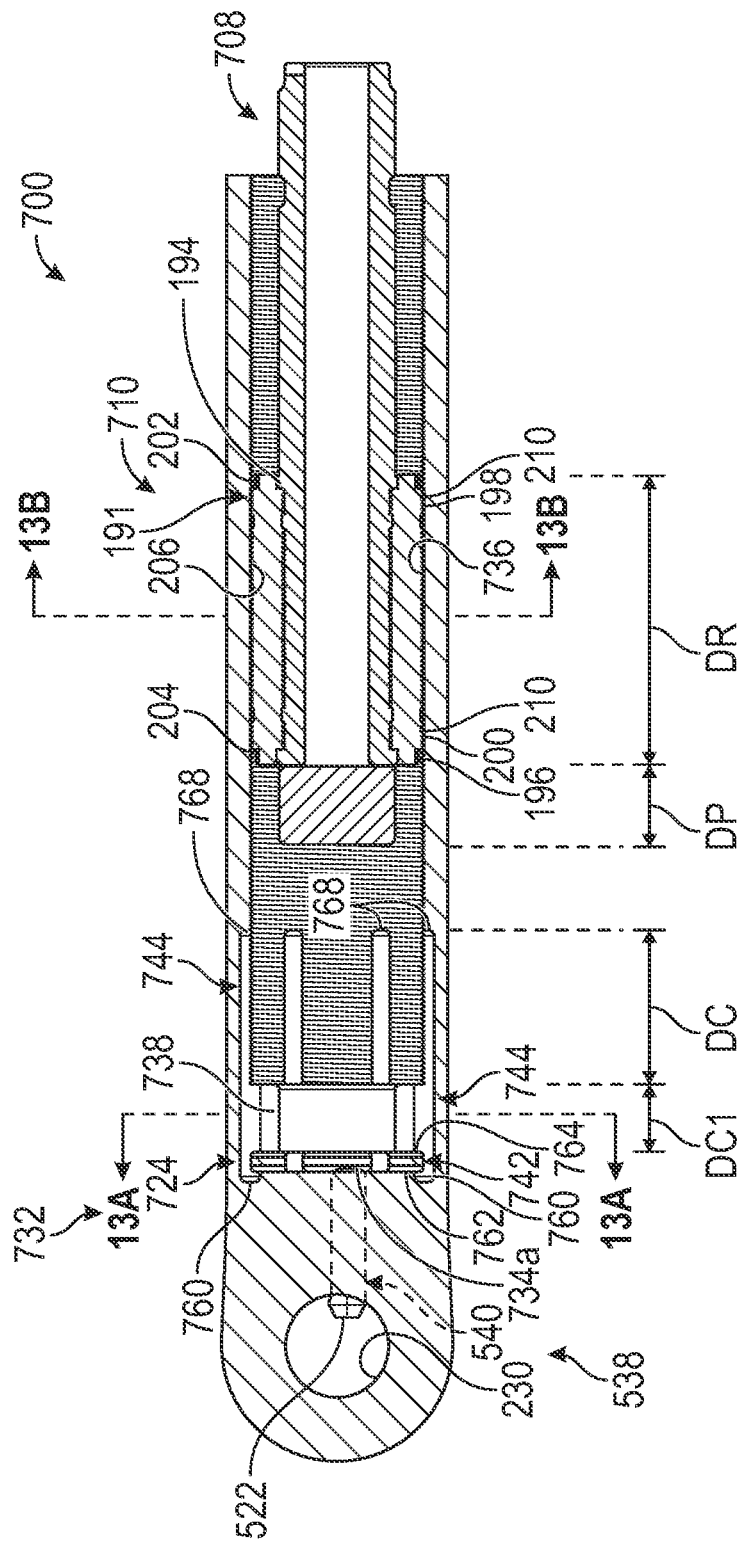
FIG. 13 is a cross-sectional view of the actuator system of FIG. 11, taken along line 13-13 of FIG. 11.

In one example, the at least one lubrication channel 724 includes a first distribution channel 742 and a plurality of second distribution channels 744. The first distribution channel 742 is in fluid communication with the lubrication input bore 540, and is in fluid communication with each of the second distribution channels 744 to distribute the lubricant to the second distribution channels 744 based on pressure or input received from the plunger 790. In one example, the first distribution channel 742 is a circumferential groove, which is defined about an inner perimeter or circumference of the counterbore 734 proximate the second nut end 732 and at the terminal end 734a of the counterbore 734. The first distribution channel 742 is in communication with the lubricant reservoir 738. With reference to FIG. 13, each of the second distribution channels 744 is in fluid communication with the first distribution channel 742. In this example, the first distribution channel 742 includes a first side 762 opposite a second side 764. Each of the second distribution channels 744 is defined to extend through the first distribution channel 742 from the first side 762 to the second side 764 such that each of the second distribution channels 744 intersect the first distribution channel 742. In this example, a first channel end 760 of each of the second distribution channels 744 is defined beyond the first side 762 of the first distribution channel 742. However, in other examples, the first channel end 760 may be defined along the second side 764 or the lubricant reservoir 738.

Each of the second distribution channels 744 extends from the first channel end 760 through the lubricant reservoir 738 to an opposite second channel end 768. In one example, the second distribution channels 744 are defined through a portion of the nut threads 736. Generally, the lubricant reservoir 738 defines a reservoir for the lubricant, which may be dispersed to the respective one of the second distribution channels 744 upon entry of the plunger 790 into the lubricant reservoir 738. The second distribution channels 744 are spaced apart about the inner perimeter or circumference of the counterbore 746, and generally extend along an axis substantially parallel to the longitudinal axis L7. In one example, there is one second distribution channel 744 associated with each pair of the rollers 192 to ensure each of the rollers 192 is sufficiently lubricated. It should be noted that in other examples, the rollers 192 may have a one to one correspondence with each of the second distribution channels 744. Generally, the inverted nut lubrication system 710 includes about five to about eight of the second distribution channels 744, and the pitch diameter of the pattern of the second distribution channels 744 is about 1.0 times to about 1.3 times a minor thread diameter of one of the rollers 192. Each of the second distribution channels 744 is defined in the counterbore 746 to extend axially over the channel distance DC. Generally, the channel distance DC is defined so that at least a portion of the rollers 192 is in fluid communication with the second distribution channels 744 in the first, retracted position (FIG. 14). In one example, the channel distance DC is about 0.8 times to about 1.1 times a distance DR. The distance DR is a length of each of the rollers 192, and is defined between the first roller guide 194 and the second roller guide 196.

Figure 13A:
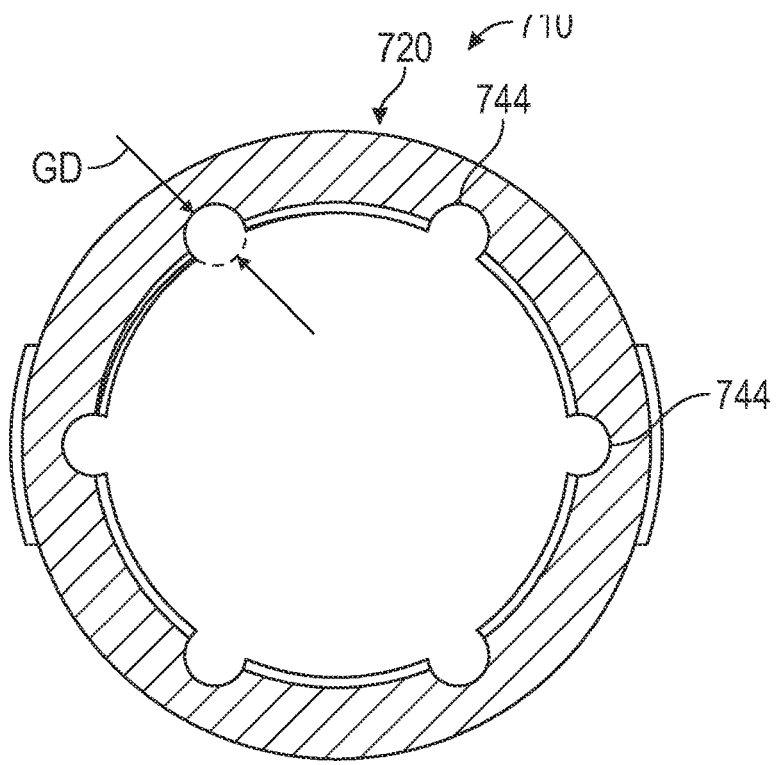
FIG. 13A is a cross-sectional view of the actuator system of FIG. 11, taken at line 13A-13A of FIG. 13.
Figure 13B:
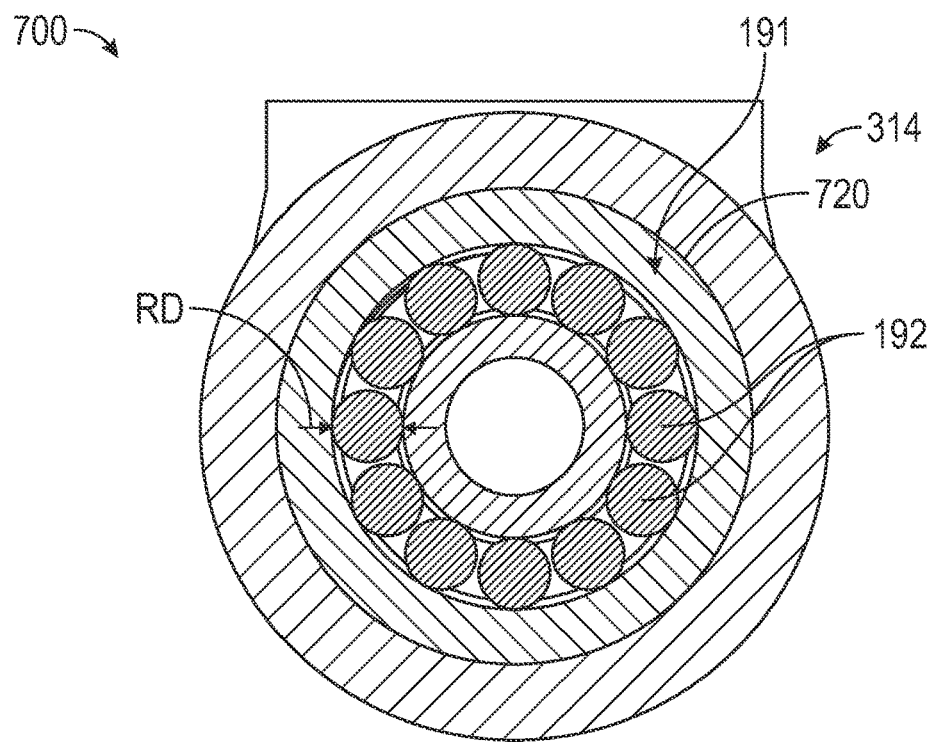
FIG. 13B is a cross-sectional view of the actuator system of FIG. 11, taken at line 13B-13B of FIG. 13.

By extending for the channel distance DC, the second distribution channels 744 ensure that the rollers 192 of the inverted roller screw 191 are lubricated when the actuator system 700 is in the first, retracted position (as shown in FIG. 14). This improves a life of the rollers 192, and of the inverted nut lubrication system 710, by ensuring proper lubrication between the rotating components. In this example, the channel distance DC is different than a sum of a distance DP of the plunger 790 and the distance DR. The distance DP of the plunger 790 is about 0.5 times to about 0.8 times a minor thread diameter of the roller 192. By providing the channel distance DC different than the sum of the distances DP, DR, the rotation of the rollers 192 may be used to draw the lubricant from proximate the second roller end 204 to the first roller end 202. The second distribution channels 744 are each defined to have a groove depth GD (FIG. 13A), which is about 0.5 times to about 0.6 times the roller diameter RD (FIG. 13B). The second distribution channels 744 are each defined to extend the distance DC1 from the first distribution channel 742 to fluidly couple each of the second distribution channels 744 to the first distribution channel 742. In one example, the distance DC1 is about 1.2 times to about 1.5 times the groove depth GD. Thus, each of the second distribution channels 744 has an overall channel length that is a sum of the distance DC1 and the distance DC.

The lubrication fitting 522 is configured to control the flow of the lubricant into the lubrication input bore 540 and is a source of the lubricant for the inverted nut 720. In one example, the lubrication fitting 522 is a grease fitting. The first fitting end 550 is configured to be coupled to a source of the lubricant, such as a grease gun. The second fitting end 552 includes a plurality of fitting threads 556, which engage or mate with the threads 547 of the lubrication input bore 540. The bore 554 includes a seal 558, which may be pierced by a grease gun, for example, to inject the lubricant into the lubrication input bore 540. It should be noted, however, that other types of lubricant fittings may be employed with the actuator system 700.

In one example, in order to assemble the actuator system 700, with the gearbox 304 coupled to the output shaft 358 of the motor 302, the sensor 306, the motor 302 and the gearbox 304 are coupled to the first actuator housing 312. The rollers 192 are coupled to the first roller guide 194 and the second roller guide 196 so that the respective roller gear teeth 210 engage with each of the first toothed section 198 and the second toothed section 200. The inverted nut lubrication system 710 is coupled about the inverted roller screw 191 such that the nut threads 736 engage with the roller threads 206. The bearings 330 are each coupled to the first end 384 of the inner shaft 708, and the inner shaft 708 is coupled to the first actuator housing 312. With the scraper 152 and the bushing 150 coupled to the second actuator housing 314, the second actuator housing 314 is coupled about the first actuator housing 312 and a portion of the inverted nut lubrication system 710. With the actuator system 700 assembled, the first coupling bearing 136 is coupled to the frame 12 of the vehicle 10, and the second coupling bearing 232 is coupled to the flight control surface 14 of the vehicle 10.

In order to lubricate the inverted roller screw 191, the lubricant is fluidly coupled to the lubrication input bore 540 via the lubrication fitting 522. The lubricant flows through the lubrication input bore 540 to the first distribution channel 742. From the first distribution channel 742, the lubricant flows into the lubricant reservoir 738. The actuator system 700 is moved from the second, extended position (shown in FIG. 13) to the first, retracted position (shown in FIG. 14). With reference to FIG. 14, the inverted nut lubrication system 710 is in the first, retracted position. As the actuator system 700 moves to the first, retracted position, the plunger 790 enters into the lubricant reservoir 738. The advancement of the plunger 790 into the lubricant reservoir 738 causes the lubricant to be pressurized and forced or pushed into the first distribution channel 742. The further advancement of the plunger 790 further pressurizes the lubricant, and causes the lubricant to be forced or pushed from the first distribution channel 742 to the second distribution channels 744. In second distribution channels 744, the lubricant flows onto the rollers 192. Once the motor 302 is actuated, via one or more control signals received from the controller associated with the vehicle 10 for example, the output shaft 358 rotates the gearbox 304. The rotation of the gearbox 304 rotates or drives the inner shaft 708. The rotation of the inner shaft 708 moves or rotates the rollers 192 of the inverted roller screw 191, which causes lubricant in the second distribution channels 744 to be drawn onto the roller threads 206, and spread along the roller threads 206 with the rotation of the rollers 192. The rotation of the rollers 192 causes the inverted nut 720 to rotate, and also transfers the lubricant from the roller threads 206 to the nut threads 736 to lubricate the inverted nut 720. The engagement of the nut threads 736 with the roller threads 206 enables a movement or translation of the output rod or inverted nut 720 relative to the inner shaft 308 and the actuator housing 316, which moves the flight control surface 14 relative to the frame 12.

Thus, the actuator system 100, 300, 500, 700 enables the movement of the flight control surface 14 relative to the frame 12 of the vehicle 10. The use of the inverted roller screw 191 in cooperation with the inverted nut 110, 520, 720 to move the flight control surface 14 reduces a weight associated with the vehicle 10. In this regard, the inverted roller screw 191 and the inverted nut 110, 520, 720 have a better dynamic load capacity, which enables a reduction in a diameter of the inverted roller screw 191, which in turn, enables smaller outer diameter for the inverted nut 110, 520, 720 that forms the output rod for the actuator system 100, 300, 500, 700. The reduction in size of the actuator system 100, 300, 500, 700 provides a weight savings of about 5% to 15%. In addition, as the outer diameter of the inverted nut 110, 520, 720 forms the output rod for the actuator system 100, 300, 500, 700, which has a larger diameter than the inverted roller screw 191, the inverted nut 110, 520, 720 provides increased stiffness for the actuator system 100, 300, 500, 700.

In addition, the use of the inverted nut lubrication system 510, 710 enables the inverted roller screw 191 and the nut threads 536, 736 to be easily lubricated, which reduces wear on the inverted roller screw 191 and the inverted nut 520, 720. In the example of the inverted nut lubrication system 510, an external device, such as a grease gun may be employed with the actuator system 500 and coupled to the lubrication fitting 522 in the first, retracted position to pressurize the lubricant to flow through the first distribution channel 542, the second distribution channels 544 and into the roller threads 206. In the example of the inverted nut lubrication system 710, an external device, such as a grease gun may be employed with the actuator system 700 and coupled to the lubrication fitting 722 to fill the lubricant reservoir 738. With the lubricant reservoir 738 filled with the lubricant, the movement of the actuator system 700 to the first, retracted position causes the plunger 790 to pressurize the lubricant in the lubricant reservoir 738 and cause the lubricant to flow through the first distribution channel 742 and the second distribution channels 744 and into the roller threads 206. Once the lubricant is on the roller threads 206, the movement of the inverted roller screw 191 relative to the inverted nut 520, 720 causes the lubricant to lubricate the nut threads 536, 736. By providing the inverted nut lubrication system 510, 710, the inverted roller screw 191 and the inverted nut 520, 720 may be lubricated without disassembly, which reduces maintenance time and the complexity of maintenance.

It should be noted that the gearbox 304 associated with the actuator system 300, 500, 700 described and illustrated herein may be optional. In this regard, in certain embodiments, the motor 302 may be directly coupled or connected to the inner shaft 308, 708 such that the motor 302 directly drives the inner shaft 308, 708. Further, while the actuator system 100, 300, 500, 700 has been illustrated and described herein as including the respective sensor 106, 106', 306, it should be noted that in other embodiments, the vehicle 10 may include a sensor on the frame 12, which is configured to observe a position of the flight control surface 14. For example, the frame 12 may include a position sensor that observes the position of the flight control surface 14 and/or the inverted nut 110, 520, 720. The actuator system 100, 300, 500, 700 may include a sensor that observes a rotation of the motor 102, 302, which may be used by the controller to control the operation of the motor 102, 302.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An actuator system for a flight control surface of an aerial vehicle, comprising:
a shaft including at least one roller configured to rotate with the shaft and a plunger, the at least one roller including a plurality of roller threads;
an inverted nut defining an inner bore including a plurality of nut threads, the inverted nut coupled about the shaft such that the plurality of nut threads are configured to engage with the plurality of roller threads to move the inverted nut relative to the shaft, the inverted nut includes a source of a lubricant in fluid communication with the inner bore and the plunger is configured to be received within the inner bore to supply the lubricant to the at least one roller; and
an actuator housing configured to be coupled to a frame of the aerial vehicle, the inverted nut defining an output rod having a coupling flange configured to be coupled to the flight control surface and the inverted nut is movable relative to the actuator housing.

2. The actuator system of claim 1, wherein the inner bore further defines a lubricant reservoir in fluid communication with the source of the lubricant that is configured to receive the lubricant and at least one distribution channel in fluid communication with the lubricant reservoir.

3. The actuator system of claim 2, wherein the plunger is configured to be received within the lubricant reservoir to distribute the lubricant to the at least one distribution channel to supply the lubricant to the at least one roller.

4. The actuator system of claim 3, wherein the inverted nut includes an inlet bore in communication with a lubrication fitting, the lubrication fitting is the source of the lubricant, and the at least one distribution channel includes a first distribution channel in fluid communication with the inlet bore and at least one second distribution channel in fluid communication with the first distribution channel.

5. The actuator system of claim 4, wherein the at least one second distribution channel includes a plurality of second distribution channels, the at least one roller includes a plurality of rollers, and each of the plurality of second distribution channels is associated with a respective one of the plurality of rollers.

6. The actuator system of claim 4, wherein the first distribution channel is defined about an inner perimeter of the inner bore at a terminal end of the inner bore, and the at least one second distribution channel is defined axially to intersect at least a portion of the first distribution channel.

7. The actuator system of claim 1, wherein the shaft has a first shaft end opposite a second shaft end, the at least one roller is coupled to the shaft proximate the second shaft end so as to be disposed between the first shaft end and the second shaft end, and the plunger is coupled to the second shaft end.

8. The actuator system of claim 1, wherein the at least one roller includes a plurality of rollers each having the plurality of roller threads, the shaft further comprises an inverted roller screw that includes the plurality of rollers and the plunger extends axially outward from the inverted roller screw.

9. An actuator system for a flight control surface of an aerial vehicle, comprising:

an actuator housing having a first coupling flange configured to be coupled to the aerial vehicle;
a shaft disposed within the actuator housing, the shaft including an inverted roller screw configured to rotate with the shaft, the inverted roller screw including a plurality of rollers with each of the plurality of rollers including a plurality of roller threads; and
an inverted nut defining an inner bore including a plurality of nut threads and a second coupling flange configured to be coupled to the flight control surface, the inverted nut coupled about the shaft such that the plurality of nut threads are configured to engage with the plurality of roller threads to move the inverted nut relative to the actuator housing, the inverted nut includes a source of a lubricant in fluid communication with the inner bore and the inner bore is configured to supply the lubricant to the plurality of rollers,
wherein the source of the lubricant is a lubrication fitting coupled to the inverted nut, and the inverted nut includes at least one distribution channel in fluid communication with the lubrication fitting and the inner bore to supply the lubricant to the inner bore.

10. The actuator system of claim 9, wherein the at least one distribution channel includes a first distribution channel and at least one second distribution channel, the first distribution channel is defined about an inner perimeter of the inverted nut and the at least one second distribution channel is in fluid communication with the first distribution channel to supply the lubricant to the inner bore.

11. The actuator system of claim 10, wherein the at least one second distribution channel comprises a plurality of second distribution channels spaced apart about the inner perimeter, with each of the plurality of second distribution channels associated with one of the plurality of rollers.

12. The actuator system of claim 11, wherein each of the plurality of second distribution channels intersects at least a portion of the first distribution channel to supply the lubricant to the inner bore.

13. An actuator system for a flight control surface of an aerial vehicle, comprising:
an actuator housing having a first coupling flange configured to be coupled to the aerial vehicle;
a shaft disposed within the actuator housing, the shaft including an inverted roller screw configured to rotate with the shaft, the inverted roller screw including a plurality of rollers with each of the plurality of rollers including a plurality of roller threads; and
an inverted nut defining an inner bore including a plurality of nut threads and a second coupling flange configured to be coupled to the flight control surface, the inverted nut coupled about the shaft such that the plurality of nut threads are configured to engage with the plurality of roller threads to move the inverted nut relative to the actuator housing, the inverted nut includes a source of a lubricant in fluid communication with the inner bore and the inner bore is configured to supply the lubricant to the plurality of rollers,
wherein the shaft further comprises a plunger, the inverted nut further comprises a lubricant reservoir in fluid communication with the source of the lubricant, and the plunger is configured to be received within the lubricant reservoir to supply the lubricant to the plurality of rollers.

14. The actuator system of claim 13, wherein the inverted nut includes an inlet bore in communication with a lubrication fitting, the lubrication fitting is the source of the lubricant, the inverted nut includes at least one distribution channel in fluid communication with the lubrication fitting, the at least one distribution channel includes a first distribution channel in fluid communication with the inlet bore and at least one second distribution channel in fluid communication with the first distribution channel.

15. The actuator system of claim 14, wherein the at least one second distribution channel includes a plurality of second distribution channels, and each of the plurality of second distribution channels is associated with a respective one of the plurality of rollers.

16. The actuator system of claim 14, wherein the first distribution channel is defined about an inner perimeter of the inner bore at a terminal end of the inner bore proximate the lubricant reservoir, and the at least one second distribution channel is defined axially to intersect at least a portion of the first distribution channel.

17. The actuator system of claim 13, wherein the shaft has a first shaft end opposite a second shaft end, the inverted roller screw is coupled to the shaft proximate the second shaft end so as to be disposed between the first shaft end and the second shaft end, and the plunger is coupled to the second shaft end.

* * * * *